(12) United States Patent
Hori et al.

(10) Patent No.: US 7,599,890 B2
(45) Date of Patent: Oct. 6, 2009

(54) CONTENT DATA STORAGE

(75) Inventors: Yoshihiro Hori, Gifu (JP); Hiroshi Takemura, Aichi (JP); Takatoshi Yoshikawa, Ogaki (JP); Toshiaki Hioki, Ogaki (JP); Takahisa Hatakeyama, Kawasaki (JP); Takayuki Hasebe, Kawasaki (JP); Shigeki Furuta, Kawasaki (JP); Masataka Takahashi, Ishikawa (JP); Takeaki Anazawa, Tokyo (JP); Tadaaki Tonegawa, Kodaira (JP)

(73) Assignees: Sanyo Electric Co., Ltd., Moriguchi-shi (JP); Fujitsu Limited, Kawasaki (JP); Hitachi, Ltd., Tokyo (JP)

( * ) Notice: Subject to any disclaimer, the term of this patent is extended or adjusted under 35 U.S.C. 154(b) by 1275 days.

(21) Appl. No.: 10/239,837

(22) PCT Filed: Mar. 28, 2001

(86) PCT No.: PCT/JP01/02606

§ 371 (c)(1),
(2), (4) Date: Sep. 30, 2002

(87) PCT Pub. No.: WO01/76136

PCT Pub. Date: Oct. 11, 2001

(65) Prior Publication Data

US 2004/0010467 A1 Jan. 15, 2004

(30) Foreign Application Priority Data

Mar. 30, 2000 (JP) .............................. 2000-93531

(51) Int. Cl.
*G06F 17/60* (2006.01)
*G06F 17/30* (2006.01)

(52) U.S. Cl. .......................... 705/51; 380/30; 380/286; 713/171; 713/181; 713/159; 340/7.21

(58) Field of Classification Search .................. 705/51, 705/57, 24, 59, 54; 707/9; 709/219; 713/192, 713/171; 380/271, 30
See application file for complete search history.

(56) References Cited

U.S. PATENT DOCUMENTS 5,202,922 A * 4/1993 Iijima .......................... 380/45

(Continued)

FOREIGN PATENT DOCUMENTS

EP 0 715 241 A2 6/1996

(Continued)

OTHER PUBLICATIONS

European Pantent Application, filed on Nov. 5, 1998 and published on Apr. 26, 2000—Inventor:Katsumata et al. Title: Apparatus for Data Distribution, and terminal for data distribution App#:EP 0 996 074.*

(Continued)

*Primary Examiner*—Evens J Augustin
(74) *Attorney, Agent, or Firm*—Westerman, Hattori, Daniels & Adrian, LLP.

(57) ABSTRACT

A memory card (110) includes a memory (1415) to store encrypted content data, a license hold unit (1440) to store at least a portion of license information distributed by a distribution system, a plurality of authentication data hold units (1400.1, 1400.2), each storing a plurality of authentication data that are authenticated respectively by a plurality of public authentication keys KPma, KPmb common to the distribution system, and a switch (SW2) to selectively provide the data from the plurality of authentication data hold units outside of said recording apparatus according to a request external to the memory card (110).

17 Claims, 27 Drawing Sheets

U.S. PATENT DOCUMENTS

| | | | |
|---|---|---|---|
| 5,241,599 A * | 8/1993 | Bellovin et al. | 713/171 |
| 5,535,276 A * | 7/1996 | Ganesan | 713/155 |
| 5,557,346 A * | 9/1996 | Lipner et al. | 380/286 |
| 5,638,443 A * | 6/1997 | Stefik et al. | 705/54 |
| 5,646,999 A * | 7/1997 | Saito | 705/54 |
| 5,671,412 A * | 9/1997 | Christiano | 707/104.1 |
| 5,778,071 A * | 7/1998 | Caputo et al. | 713/159 |
| 5,790,664 A * | 8/1998 | Coley et al. | 709/203 |
| 5,850,444 A * | 12/1998 | Rune | 705/79 |
| 5,867,579 A | 2/1999 | Saito | |
| 5,915,021 A * | 6/1999 | Herlin et al. | 705/67 |
| 5,925,127 A * | 7/1999 | Ahmad | 713/200 |
| 5,956,403 A * | 9/1999 | Lipner et al. | 713/181 |
| 6,009,401 A * | 12/1999 | Horstmann | 705/1 |
| 6,056,786 A * | 5/2000 | Rivera et al. | 717/168 |
| 6,073,124 A * | 6/2000 | Krishnan et al. | 705/59 |
| 6,084,969 A * | 7/2000 | Wright et al. | 380/271 |
| 6,226,618 B1 * | 5/2001 | Downs et al. | 705/1 |
| 6,584,567 B1 * | 6/2003 | Bellwood et al. | 713/171 |
| 6,779,115 B1 * | 8/2004 | Naim | 713/192 |

FOREIGN PATENT DOCUMENTS

| | | |
|---|---|---|
| EP | 0 840 194 A2 | 5/1998 |
| EP | 0 898 260 A1 | 2/1999 |
| EP | 996074 A1 * | 4/2000 |
| JP | 8-287014 | 11/1996 |
| JP | 9-307543 | 11/1997 |
| JP | 10-260630 | 9/1998 |
| JP | 11-355268 | 12/1999 |

OTHER PUBLICATIONS

Yikoshi Yamanaka et al.; Multimedia on Demand Service ni okeru Joho Hogo System, NTT R&D, vol. 44, No. 9, pp. 813-818, Sep. 1995. See PCT search rpt.

Partial English translation of Kogata Memory Card de Ongaku Chosakuken wo mamoru, Nikkei Electronics, No. 739, pp. 49-53, Mar. 1999. See PCT search rpt.

Communication from the European Patent Office dated Apr. 25, 2006 in the corresponding European patent application.

* cited by examiner

FIG.2

| LABEL | FUNCTION · FEATURE | STORAGE GENERATION SITE |
|---|---|---|
| Data | CONTENT DATA, DISTRIBUTED IN THE FORM OF {Data}Kc AS ENCRYPTED CONTENT DATA SUBJECTED TO ENCRYPTION THAT CAN BE DECRYPTED WITH Kc | DISTRIBUTION SERVER |
| Data-inf | ADDITIONAL INFORMATION, INFORMATION IN PLAINTEXT RELATED TO COPYRIGHT OF CONTENT DATA OR SERVER ACCESS | DISTRIBUTION SERVER |
| Kc | CONTENT DECRYPTION KEY | DISTRIBUTION SERVER |
| Kp(x)/ Kmc(x) | DECRYPTION KEY DEPENDING ON CONTENT REPRODUCTION/MEDIA CLASS (TYPE OR THE LIKE) x IS IDENTIFIER TO IDENTIFY CLASS | CELLULAR PHONE MEMORY CARD |
| KPp(x)/ KPmc(x) | ASYMMETRIC ENCRYPTION KEY THAT CAN BE DECRYPTED USING Kp(x)/Kmc(x), RECORDED IN THE FORM OF {KPp(x)}KPmy/{KPp(x)}KPmy y = a, b WITH CERTIFIED ENCRYPTION | CELLULAR PHONE MEMORY CARD |
| KPma/ KPmb | PUBLIC KEY (AUTHENTICATION KEY) COMMON TO SYSTEM | DISTRIBUTION SERVER |
| AC | PURCHASE CONDITION OF LICENSE FROM USER SIDE (FUNCTION RESTRICTION, NUMBER OF LICENSES, ETC) | DISTRIBUTION SERVER |
| AC1 | INFORMATION AS TO RESTRICTION ON MEMORY ACCESS | DISTRIBUTION SERVER |
| AC2 | CONTROL INFORMATION OF REPRODUCTION CIRCUIT | DISTRIBUTION SERVER |
| Km(i) | DECRYPTION KEY UNIQUE TO EACH MEMORY CARD i IS IDENTIFIER TO IDENTIFY CARD | MEMORY CARD |
| KPm(i) | ASYMMETRIC ENCRYPTION KEY THAT CAN BE DECRYPTED WITH Km(i) | MEMORY CARD |
| Ks1 | SYMMETRIC KEY UNIQUE TO SESSION, GENERATED FOR EACH DISTRIBUTION SESSION | DISTRIBUTION SERVER |
| Ks2 | SYMMETRIC KEY UNIQUE TO SESSION, GENERATED FOR EACH DISTRIBUTION/TRANSFER (RECEPTION) SESSION | MEMORY CARD |
| Ks3 | SYMMETRIC KEY UNIQUE TO SESSION, GENERATED FOR EACH REPRODUCTION SESSION | MEMORY CARD |
| Ks4 | SYMMETRIC KEY UNIQUE TO SESSION, GENERATED FOR EACH REPRODUCTION SESSION | CELLULAR PHONE |
| CONTENT ID | CODE TO IDENTIFY CONTENT DATA Data | DISTRIBUTION SERVER |
| TRANSACTION ID | CODE TO IDENTIFY DISTRIBUTION SESSION, GENERATED FOR EACH DISTRIBUTION SESSION | DISTRIBUTION SERVER |
| LICENSE ID | ADMINISTRATION CODE TO IDENTIFY ISSUE OF LICENSE (MAY BE SHARE WITH TRANSACTION ID) | DISTRIBUTION SERVER |

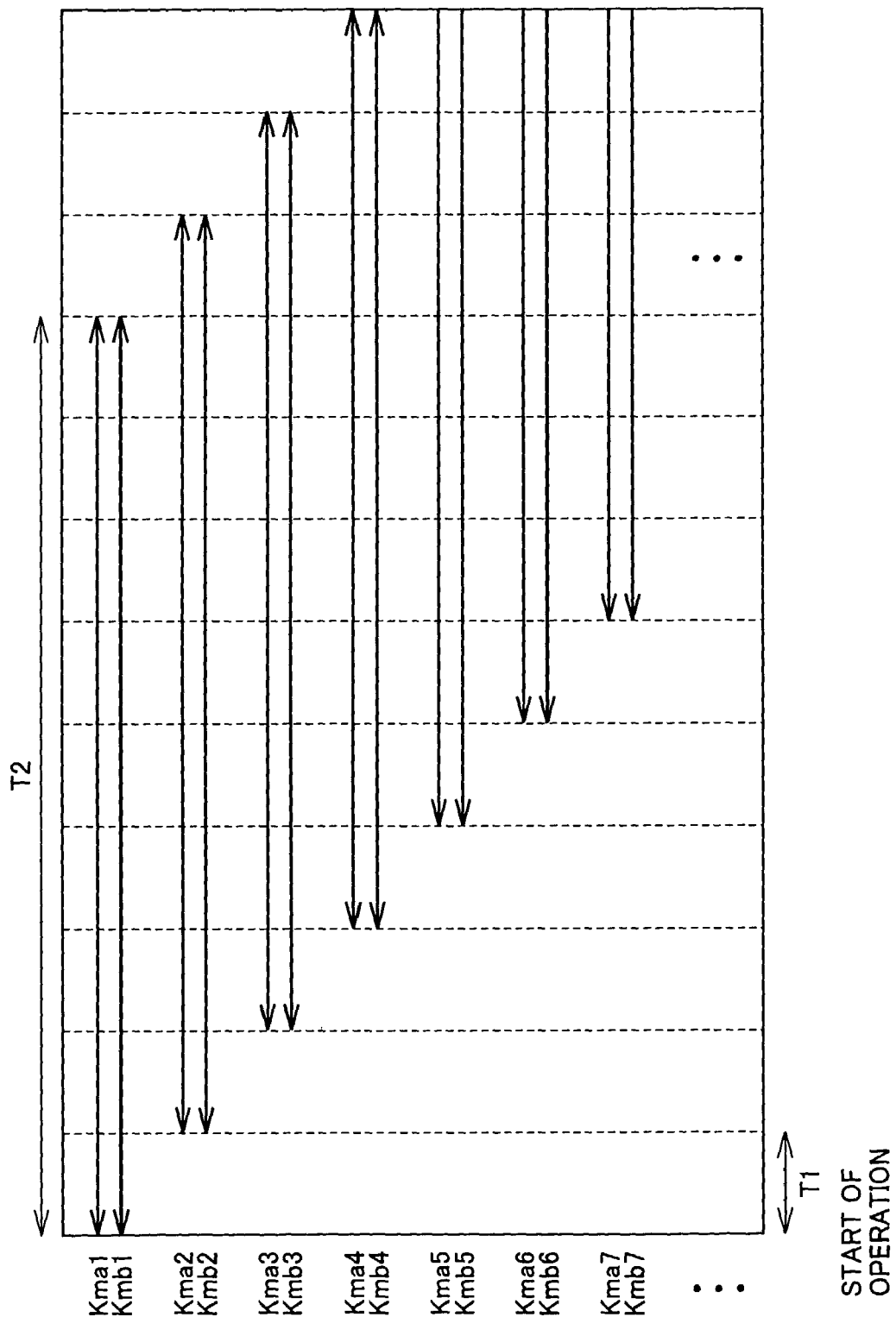

FIG.15

| Kc | CONTENT DECRYPTION KEY | DISTRIBUTION SERVER |
|---|---|---|
| Kp(x)/ Kmc(x) | DECRYPTION KEY DEPENDING ON CONTENT REPRODUCTION/MEDIA CLASS (TYPE OR THE LIKE) x IS IDENTIFIER TO IDENTIFY CLASS | CELLULAR PHONE MEMORY CARD |
| KPp(x)/ KPmc(x) | ASYMMETRIC ENCRYPTION KEY THAT CAN BE DECRYPTED WITH Kp(x)/Kmc(x), RECORDED IN THE FORM OF {KPp(x)}KPma/{KPp(x)}KPmx x = a, b WITH CERTIFIED ENCRYPTION | CELLULAR PHONE MEMORY CARD |
| KPma/ KPmb | PUBLIC KEY (AUTHENTICATION KEY) COMMON TO SYSTEM | DISTRIBUTION SERVER |
| AC | PURCHASE CONDITION OF LICENSE FROM USER SIDE (FUNCTION RESTRICTION, NUMBER OF LICENSE, ETC) | DISTRIBUTION SERVER |
| AC1 | INFORMATION AS TO RESTRICTION ON MEMORY ACCESS | DISTRIBUTION SERVER |
| AC2 | CONTROL INFORMATION OF REPRODUCTION CIRCUIT | DISTRIBUTION SERVER |
| Km(i) | DECRYPTION KEY UNIQUE TO EACH MEMORY CARD i IS IDENTIFIER TO IDENTIFY CARD | MEMORY CARD |
| KPm(i) | ASYMMETRIC ENCRYPTION KEY THAT CAN BE DECRYPTED WITH Km(i) | MEMORY CARD |
| K(i) | SYMMETRIC PRIVATE KEY UNIQUE TO MEMORY (i IS IDENTIFIER TO IDENTIFY CARD) | MEMORY CARD |
| Ks1 | SYMMETRIC KEY UNIQUE TO SESSION, GENERATED FOR EACH DISTRIBUTION SESSION | DISTRIBUTION SERVER |
| Ks2 | SYMMETRIC KEY UNIQUE TO SESSION, GENERATED FOR EACH DISTRIBUTION/TRANSFER (RECEPTION) SESSION | MEMORY CARD |
| Ks3 | SYMMETRIC KEY UNIQUE TO SESSION, GENERATED FOR EACH REPRODUCTION SESSION | MEMORY CARD |
| Ks4 | SYMMETRIC KEY UNIQUE TO SESSION, GENERATED FOR EACH REPRODUCTION SESSION | CELLULAR PHONE |
| CONTENT ID | CODE TO IDENTIFY CONTENT DATA Data | DISTRIBUTION SERVER |
| TRANSACTION ID | CODE TO IDENTIFY DISTRIBUTION SESSION, GENERATED FOR EACH DISTRIBUTION SESSION | DISTRIBUTION SERVER |
| LICENSE ID | ADMINISTRATION CODE TO IDENTIFY ISSUE OF LICENSE (MAY BE SHARE WITH TRANSACTION ID) | DISTRIBUTION SERVER |

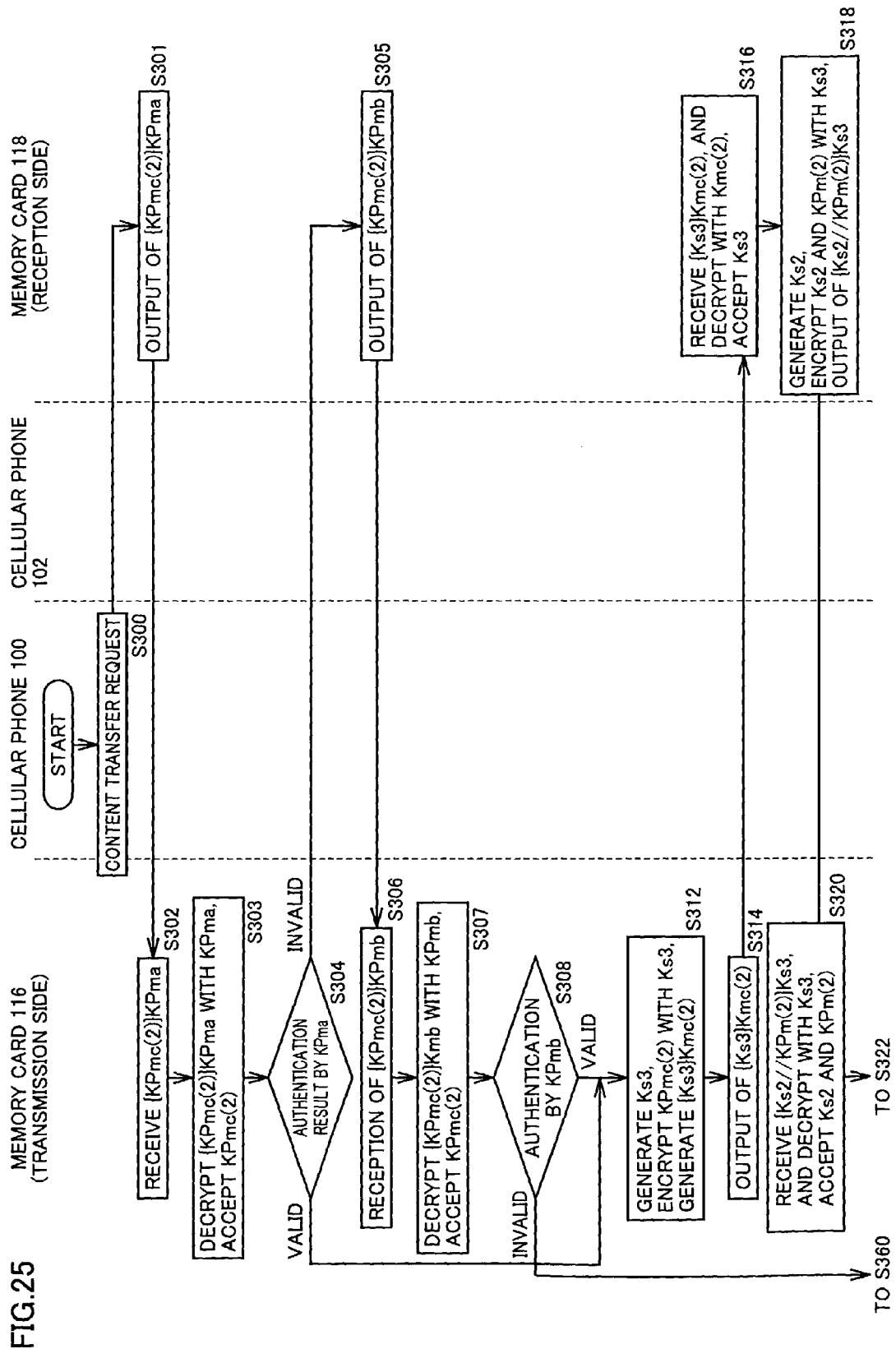

FIG.26

FROM S308 → MEMORY CARD 116 | CELLULAR PHONE 100 | CELLULAR PHONE 102 | MEMORY CARD 118

S320: FROM S308

S322: CONFIRMATION OF AC1 IN LICENSE HOLD UNIT

S324: AFTER OBTAINING AC1 FROM LICENSE HOLD UNIT, ALTER AC1 IN LICENSE HOLD MEANS TO 0000h

S325': OBTAIN Kc, AC1, CONTENT ID, LICENSE ID OF LICENSE HOLD UNIT

S328': ENCRYPT Kc, AC2, LICENSE ID, CONTENT ID AND AC1 USING KPm(2), GENERATION OF {Kc//AC2//LICENSE ID//CONTENT ID//AC1}Km(2)

S330: ENCRYPT [{Kc//AC2//LICENSE ID//CONTENT ID//AC1}Km(2)] USING Ks2, OUTPUT OF [{Kc//AC2//LICENSE ID//CONTENT ID//AC1}Km(2)]Ks2

S332: DECRYPT [{Kc//AC2//LICENSE ID//CONTENT ID//AC1}Km(2)]Ks2 USING Ks2, ACCEPT {Kc//AC2//LICENSE ID//CONTENT ID//AC1}Km(2)

S336': DECRYPT {Kc//AC2//LICENSE ID//CONTENT ID//AC1}Km(2) USING Km(2), ACCEPT Kc, AC2, LICENSE ID, CONTENT ID, AC1

TO S360                                                                                                    TO S338'

CONTENT DATA STORAGE

TECHNICAL FIELD

The present invention relates to a recording apparatus such as a memory card that allows copyright protection on copied information in an information distribution system to distribute information to terminals such as cellular phones, a reproduction apparatus of information recorded in such a recording apparatus, and a data distribution system including such recording apparatuses and reproduction apparatuses.

BACKGROUND ART

By virtue of the progress in the Internet and digital information communication networks, each user can now easily access network information through an individual-oriented terminal using a cellular phone or the like.

In digital information communication, information is transmitted through digital signals. For example, each user can transfer music and video information in the aforementioned digital information communication network without degradation in audio quality and picture quality.

It will be a system useful to the copyright owner if appropriate fees can be collected for distribution of content data such as copyrighted works of music and video information through the disseminating digital information communication network.

In such digital information communication networks, there is a possibility of the rights of the copyright owner being significantly infringed by a flood of replicates of copyright information within the digital information network unless some appropriate measures to protect the copyright are taken when content data corresponding to copyrighted works such as music and video information is to be transmitted.

Therefore, in distributing content data such as music or copyright information to allow reproduction of such content data through the digital information communication network, authentication with respect to the apparatus requesting distribution will become necessary.

It is also necessary to accommodate the possibility of the contents of such authentication procedures being obtained by a third party through fraudulent means to allow an improper user to receive distribution through the digital communication network.

Furthermore, it is necessary to prevent music data, once received by an appropriate user, from being replicated without restriction in a reproducible state.

DISCLOSURE OF THE INVENTION

An object of the present invention is to provide a license information storage apparatus, a content reproduction apparatus, and a license information distribution system using such apparatuses that can supply copyright information such as of music data to users that can receive/transmit data through an information communication network such as cellular phones while protecting copyrights.

Another object of the present invention is to provide a license information distribution system that can prevent distributed copyrighted data from being replicated without permission of the copyright owner, and a license information storage apparatus and content reproduction apparatus used in such a license information distribution system.

According to the present invention, a license information storage apparatus to store license information that renders encrypted content data reproducible includes a first storage unit, a plurality of authentication data hold units, a first select unit, a first key hold unit, a first decryption unit, a session key encryption unit, and a session key decryption unit.

The first storage unit includes at least a portion of license information. Each of the plurality of authentication data hold units stores a plurality of authentication data that can be respectively verified by a plurality of public authentication keys. The plurality of authentication data have a predetermined value predefined during fabrication of the license information storage apparatus, and can authenticate a first public encryption key corresponding to the type of the license information storage apparatus using respective plurality of public authentication keys. The first select unit selectively provides the authentication data from the plurality of authentication data hold units outside the license information storage apparatus according to a request external to the license information storage apparatus. The first key hold unit stores a first private decryption key that is asymmetric to the first public encryption key, and used to decrypt data encrypted with the first public encryption key. The first decryption unit receives and decrypts using the first private decryption key a first symmetric key encrypted by the first public encryption key from a supply source of license information. A session key generation unit generates a second symmetric key. The session key encryption unit encrypts the second symmetric key used for encryption of license information by the first symmetric key, and provides the encrypted key to the supply source of license information. The session key decryption unit receives license information that is supplied from the supply source of license information and that is encrypted using the second symmetric key, and decrypts the received license information using the second symmetric key.

Preferably, the license information storage apparatus further includes a second key hold unit, a session key decryption unit, a third key hold unit, and a second decryption unit.

The second key hold unit stores a second public encryption key predefined with respect to a recording apparatus. The session key decryption unit decrypts the license information from the supply source of license information, encrypted with the second symmetric key and the second public encryption key with respect to the second symmetric key. The third key hold unit stores a second private decryption key asymmetric to the second public encryption key, and used to decrypt data encrypted by the second public encryption key. The second decryption unit receives license information encrypted with the second public encryption key to decrypt the received information using the second private decryption key. The session key encryption unit encrypts the second public encryption key together with the second symmetric key using the first symmetric key, and outputs the same to be provided to the supply source of license information. The session key decryption unit receives license information supplied from the supply source of license information, encrypted with the second public encryption key, and further encrypted with the second symmetric key, and decrypts the received information by the second symmetric key.

Further preferably, the license information storage apparatus includes a second storage unit, a fourth key hold unit, a first encryption unit, and a third decryption unit.

The second storage unit stores in an encrypted state a content decryption key from the license information, used to decrypt encrypted content data. The fourth key hold unit stores at least one symmetric type secret unique key in a symmetric key scheme. This key is unique to each recording apparatus. The first encryption unit receives the output of the second decryption unit to encrypt the same with the secret unique key. The third decryption unit decrypts using the secret unique key the content decryption key encrypted by the first encryption unit and stored in the second storage unit.

According to another aspect of the present invention, a content reproduction apparatus to decrypt encrypted content data and reproduce content data includes a data storage unit, and a data reproduction unit.

The data storage unit stores encrypted content data and a content decryption key supplied individually apart from encrypted content data to decrypt the encrypted content data. The data storage unit can output the content decryption key in an encrypted state, and is detachable from the content reproduction apparatus. The data reproduction apparatus receives an output from the data storage unit to reproduce encrypted content data.

The data reproduction unit includes a first decryption unit, a second decryption unit, a plurality of authentication data hold units, a select unit, a first key hold unit, a third decryption unit, a session key generation unit, and a session key encryption unit.

BRIEF DESCRIPTION OF THE DRAWINGS

FIG. 2 is a diagram to describe the characteristics of keys related to encryption used in the communication and distributed data in the data distribution system of FIG. 1.

FIG. 3 shows the usage of certificate keys Kma and Kmb common to the system over time.

FIG. 15 is a diagram to describe characteristics of keys related to encryption used for communication and distributed data in the data distribution system of the second embodiment.

FIG. 25 is a first flow chart to describe the transfer process of the third embodiment.

FIG. 26 is a second flow chart to describe the transfer process of the third embodiment.

BEST MODES FOR CARRYING OUT THE INVENTION

First Embodiment

Figure 1:
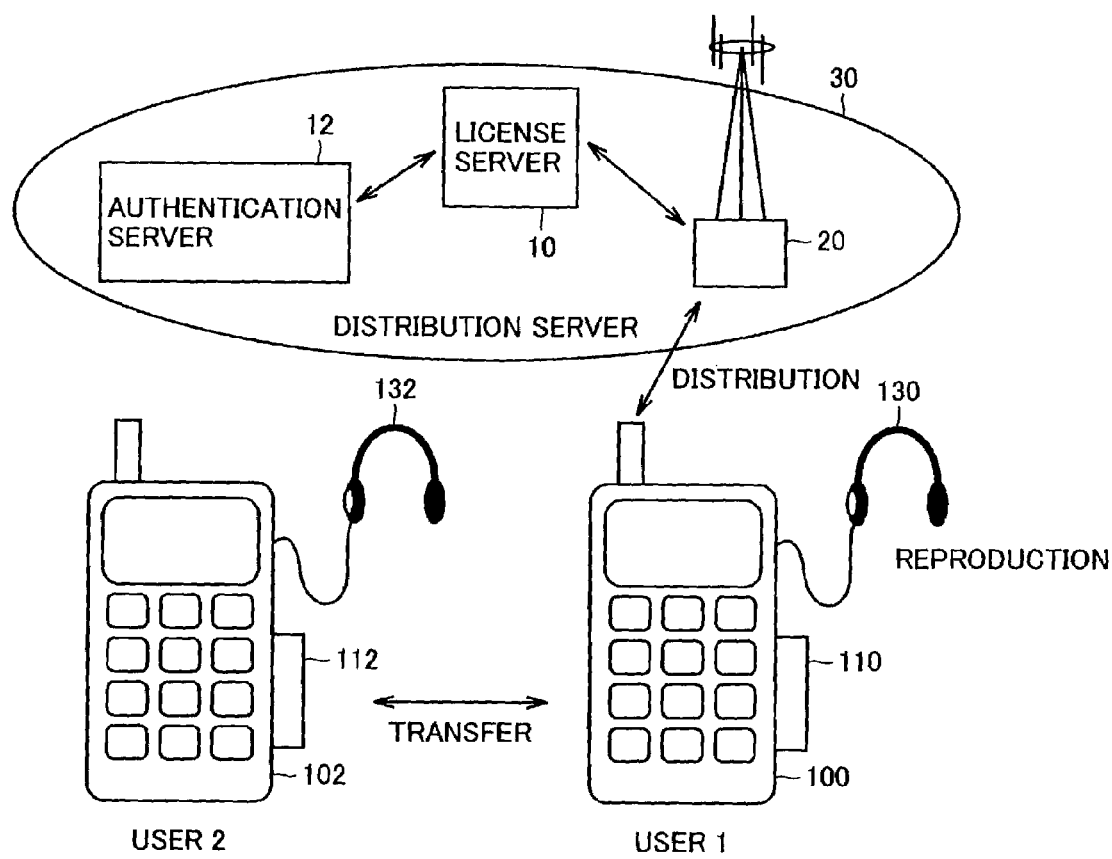
FIG. 1 is a diagram to schematically describe the entire structure of a data distribution system of the present invention.

FIG. 1 is a diagram to describe schematically an entire structure of the data distribution system of the present invention.

In the following, a data distribution system distributing music data to each user via a cellular phone network will be described as an example. However, as will become apparent from the following description, the present invention is not limited to such a case. The present invention is applicable to distribute content data corresponding to other copyrighted works such as video data, image data, book telling data, educational data, game programs, and further applicable to the case of distributing through other digital information communication networks.

Referring to FIG. 1, a license server 10 administrating copyrighted music data encrypts music data (also called "content data" hereinafter) according to a predetermined encryption scheme, and provides such encrypted content data to a cellular phone company which is a distribution carrier 20 to distribute encrypted content data and reproduction information (grant information for reproduction called "license" hereinafter) including a content decryption key which is the decryption key for the encrypted content data. An authentication server 12 challenges the authenticity of the user's cellular phone and memory card establishing access for distribution of music data.

Distribution carrier 20 relays a distribution request from each user to license server 10 through its own cellular phone network. In response to a distribution request, license server 10 verifies the authenticity of the user's memory card through authentication server 12, and distributes encrypted content data and license thereof corresponding to the music request to the user's cellular phone.

FIG. 1 corresponds to a structure in which a detachable memory card 110 is loaded in a cellular phone 100 of a user 1. Memory card 110 receives the encrypted content data and license through cellular phone 100 and applies decryption on the above encryption, and then provides the decrypted data to music reproduction unit (not shown) in cellular phone 100.

User 1, for example, can "reproduce" the content data to listen to the music via a headphone 130 or the like connected to cellular phone 100.

License server 10, authentication server 12, and distribution carrier (cellular phone company) 20 will be generically referred to as a distribution server 30 hereinafter.

The process of transmitting content data to each cellular phone or the like from distribution server 30 is called "distribution".

By such a structure, any user that has not purchased a proper memory card cannot receive and reproduce distribution data from distribution server 30.

By taking count of the number of times content data of, for example, one song, is distributed in distribution carrier 20, the copyright royalty fee induced every time a user receives content data distribution can be collected by distribution carrier 2 in the form of telephone bills of respective cellular phones. Thus, the royalty fee of the copyright owner can be ensured.

Furthermore, since such content data distribution is conducted through a cellular phone network, which is a closed system, there is the advantage that measures to protect copyrights can be taken more easily than compared to an open system such as the Internet.

Here, a user 2 possessing a memory card 112, for example, can directly receive distribution of content data from music server 30 through his/her own cellular phone 102. However, direct reception of content data or the like from music server 30 is relatively time consuming for user 2 since the content data includes a large amount of information. In such a case, it will be convenient for the user if content data can be copied from user 1 that has already received distribution of that content data.

However, from the standpoint of protecting the rights of copyright owners, unscrupulous copying of content data is not allowed on the basis of system configuration.

As shown in FIG. 1, the act of letting a user 2 copy the content data received by user 1, and transferring the license corresponding to the relevant content data of user 1 to user 2 is called "transfer" of music data. In this case, the encrypted content and license (the grant for reproduction) are transferred between memory cards 110 and 112 through cellular phones 100 and 102. As will be described afterwards, "license" includes a license decryption key that allows decryption of content data encrypted according to a predetermined encryption scheme, and license information such as a license ID corresponding to information related to copyright protection and information of restriction as to access reproduction.

In addition to "transfer", the act of copying only encrypted content data is called "replicate". Since a license is not accompanied in replication, user 2 cannot reproduce the relevant content data. Although not described here, user 2 can reproduce that content data only through another distribution of the license alone including a license encryption key.

By such a structure, the content data distributed by distribution server 30 can be used flexibly at the reception side.

In the case where cellular phones 100 and 102 are PHSs (Personal Handy Phones), information can be transferred between user 1 and user 2 taking advantage of conversation in the so-called transceiver mode.

In the structure shown in FIG. 1, the system to render the content data distributed in an encrypted manner reproducible at the user side requires: 1) the scheme to distribute an encryption key in communication, 2) the scheme per se to encrypt distribution data, and 3) a configuration realizing data protection to prevent unauthorized copying of the distributed content data.

The embodiment of the present invention corresponds to a structure of improving copyright protection of distribution data by enhancing the authentication and checking function with respect to the content data transfer destination during respective sessions of distribution and reproduction, and preventing data distribution and transfer to an unauthorized recording apparatus as well as reproduction in the content reproduction circuit (for example, cellular phone).

[System Key and Data Configuration]

FIG. 2 is a diagram to describe the characteristics of the keys associated with encryption used in communication and data to be distributed in the data distribution system of FIG. 1.

The data "Data" distributed by the distribution server is content data such as music data. The content data is distributed to a user from distribution server 30 in the form of encrypted content data {Data}Kc subjected to encryption that can be decrypted using at least a content decryption key Kc.

In the following, the expression of {Y}X implies information having data Y converted into cipher that can be decrypted using a key X.

From distribution server 30 are distributed additional information Data-inf in plaintext such as of the copyright related to content data or related to server access and the like together with the content data. Specifically, additional information Data-inf includes information to identify the content data such as the song title as well as to identify distribution server 30.

Keys related to the encryption, decryption and reproduction process of content data as well as to authentication of a cellular phone which is the content reproduction circuit and a memory card which is a recording apparatus are set forth below.

As mentioned before, there are provided a content decryption key Kc used to encrypt and decrypt content data, a public encryption key KPp(x) for the content reproduction circuit (cellular phone 100), and a public encryption key KPmc(x) for a memory card.

Data encrypted using public encryption keys KPp(x) and KPmc(x) can be decrypted respectively using a private decryption key Kp(x) unique to the content reproduction circuit (cellular phone 100) and a private decryption key Kmc(x) unique to the memory card. Public encryption keys KPp(x) and KPmc(x) are asymmetric encryption keys that can be decrypted using private decryption keys Kp(x) and Kmc(x), respectively. These unique private decryption keys have different contents for each type of cellular phone and each type of memory card. Here the type of cellular phone and memory card is defined based on the manufacturer thereof, the fabrication time (fabrication lot) and the like. Natural number x represents a number to discriminate the type of each memory card and content reproduction circuit (cellular phone).

There are also public authentication keys KPma and KPmb used common to the entire distribution system. The following description is based on the initial two authentication keys used common to the entire distribution system. However, the system is generally operated with more than two authentication keys according to the operation duration of the distribution system, as will be come apparent in the following.

Encryption keys KPmc(x) and KPp(x) specified for each memory card and content reproduction unit are recorded in respective memory cards and cellular phones at the time of shipment in the form of {KPmc(x)}KPmy and {KPp(x)}KPmy where (y=a, b) as certified public encryption keys that can be authenticated.

Information to control the operation of the apparatus constituting the system, i.e. cellular phone 100 which is a content reproduction circuit and memory card 110, includes purchase condition information AC transmitted from cellular phone 100 to distribution server 30 when a user purchases a content decryption key or the like for the purpose of specifying the purchase condition, access restriction information AC1 indicating restriction and the like as to the number of accesses to memory card 110, distributed from distribution server 30 towards memory card 110 loaded in cellular phone 100 according to purchase condition information AC corresponding to the intention of the content supplier and the content purchaser, and reproduction circuit restriction information AC2 indicating restriction as to the reproduction condition of the content reproduction circuit, transmitted from distribution server 30 to memory card 110 loaded in cellular phone 100, and applied from memory card 110 to the content reproduction circuit in cellular phone 100. The reproduction condition of the content reproduction circuit implies the condition, for example, of allowing reproduction of only the beginning of each content data for a predetermined time such as in the case where a sample is distributed at low price or freely to promote a new song.

The keys to administer data processing in memory card 110 includes a public encryption key KPm(i) (i: natural number) specified for each recording apparatus corresponding to a memory card, and a private decryption key Km(i) unique to each memory card that can decrypt data encrypted with public encryption key KPm(i). Here, natural number i represents a number to discriminate each memory card.

In the data distribution system of FIG. 1, keys used in data communication are set forth below.

The encryption key to ensure security during data transfer with an external source to the memory card or between memory cards includes symmetric keys Ks1-Ks4 generated at server 30, the content reproduction circuit (cellular phone 100 or 102), and memory card 110 or 112 every time content data distribution, reproduction or transfer is carried out.

Here, symmetric keys Ks1-Ks4 are unique symmetric keys generated for each "session" which is the access unit or communication unit among the distribution server, content reproduction circuit or memory card. In the following, these symmetric keys Ks1-Ks4 are also called "session keys".

These session keys Ks1-Ks4 have a unique value for each communication session, and is under control of the distribution server, content reproduction circuit and memory card.

More specifically, a session key Ks1 is generated for each distribution session by a license server in a distribution server. A session key Ks2 is generated for each distribution session and transfer (reception side) session of a memory card. Session key Ks3 is generated for each reproduction session and transfer (transmission side) session in a memory card. A session key Ks4 is generated for each reproduction session of the content reproduction circuit. The level of security can be improved in each session by transferring the session keys and receiving a session key generated by another apparatus to perform encryption using the session keys and transmitting the license decryption key.

Data transferred between a distribution server and a cellular phone includes a content ID for the system to identify each content data, a license ID which is an administration code to identify when and to whom the license was issued, and a transaction ID which is a code generated for each distribution session to identify each distribution session.

[Operation of System Authentication Key]

FIG. 3 shows the operation over time of secret certificate keys Kma and Kmb common to the system to carry out an encryption process to allow authentication by decrypting using public authentication keys KPma and KPmb common to the entire distribution system. Certificate key Kma and authentication key KPma, and also certificate key Kmb and authentication key KPmb respectively form a pair.

As mentioned before, the number of certificate keys operated common to the entire distribution system is initially two. It is assumed that the keys provided from the start of the system are certificate keys Kma1 and Kmb1. Corresponding to these two secret certificate keys, the operation of public authentication keys KPma1 and KPmb1 in the system is also initiated.

During a predetermined time T1 (for example two years) from the start of the system operation, the system is operated based on these two pairs of certificate keys and authentication keys.

At the elapse of time T1, secret certificate keys Kma2 and Kmb2 as well as public authentication keys KPma2 and KPmb2 common to the entire system are newly added for operation of the system. In a similar manner, two pairs of certificate keys and authentication keys are newly added at the elapse of each period of time T1 for the operation of the system.

The two certificate keys applied at the same time are inhibited of usage in the system at an elapse of a predetermined period of time T2 (for example 18 years).

By this operation, a predetermined number of sets (9 sets in the example of FIG. 3) of authentication keys, though not exclusively, will constantly be operated on the system at the elapse of period T2.

The reason why such operation of authentication keys is employed will described here. Memory card 110 will constantly retain a plurality of public authentication keys and a plurality of certified public encryption keys encrypted with a plurality of secret certificate keys, and the content reproduction circuit (cellular phone 100) will retain a plurality of certified public keys. Each secret certificate key will be administered by a different administrator. Therefore, even if one secret certificate key is obtained by a third party breaking into the system through illegal means, receiving distribution or reproduction using a certified public encryption key corresponding to an illegally obtained secret certificate key can be prevented by the authentication process using a certified public encryption key encrypted with the remaining secret certificate keys.

The number of authentication keys applied to the system at the same time is not limited to the aforementioned two, and more keys may be applied at the same time.

For the sake of simplification, it is assumed that the following description corresponds to the case of a period of time T1 right after the operation has commenced. It is assumed that two authentication keys KPma and KPmb are used in the system. The certified public encryption key is called authentication data hereinafter.

[Configuration of License Server 10]

Figure 4:
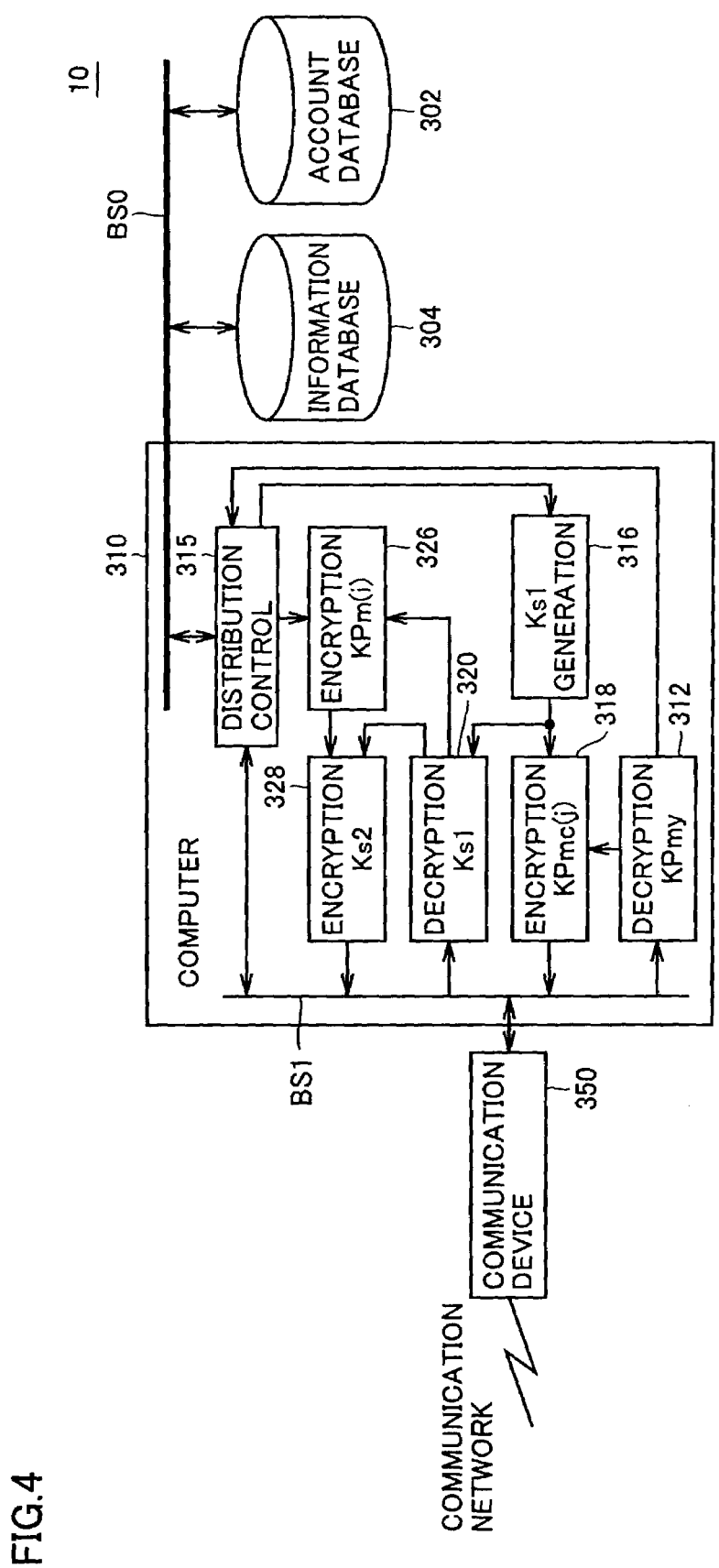
FIG. 4 is a schematic block diagram showing a structure of a license server 10 of FIG. 1.

FIG. 4 is a schematic block diagram showing a structure of license server 10 of FIG. 1.

License server 10 includes an information database 304 to store a license ID corresponding to the encrypted music data (content data) and distribution data such as a license decryption key to decrypt encrypted music data, an account database 302 to store accounting data according to the start of access to music data for each user, a data processing unit 310 receiving data through a data bus BS0 from information database 304 and accounting database 302 to apply a predetermined process, and a communication device 350 to transfer data between distribution carrier 20 and data processing unit 310 via the communication network.

Data processing unit 310 includes a distribution control unit 315 to control the operation of data processing unit 310 according to the data on data bus BS0, a session key generation unit 316 to generate a session key Ks1 in a distribution session, under control of distribution control unit 315, a decryption processing unit 312 receiving through communication device 350 and data bus BS1 authentication data {KPmc(j)}KPmy (y=a, b) sent from a memory card through a cellular phone to apply a decryption process on authentication key KPmy (y=a, b), an encryption processing unit 318 encrypting session key Ks1 generated by session key generation unit 316 using public encryption key KPmc(j) obtained by decryption processing unit 312 to provide the encrypted key to data bus BS1, and a decryption processing unit 320 receiving through data bus BS1 data encrypted with session key Ks1 and transmitted by each user.

Data processing unit 310 further includes an encryption processing unit 326 to encrypt license data output from distribution control unit 315 using a public encryption key KPm (i) unique to the memory card obtained from decryption processing unit 320, and an encryption processing unit 328 further encrypting the output of encryption processing unit 326 using a session key Ks2 applied from decryption processing unit 320 to provide the encrypted key onto data bus BS1.

[Configuration of Cellular Phone 100]

Figure 5:
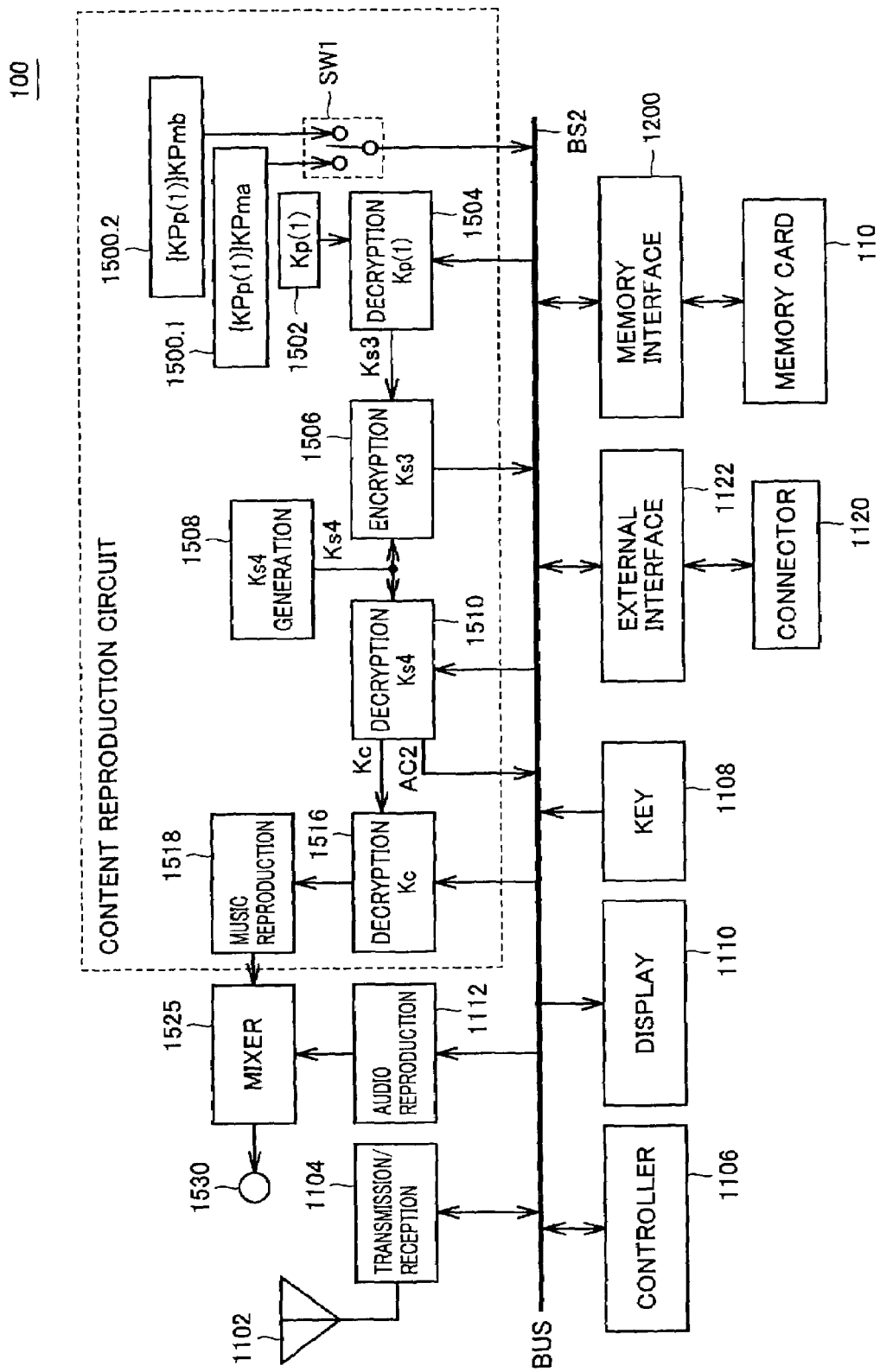
FIG. 5 is a schematic block diagram to describe a structure of a cellular phone 100 of FIG. 1.

FIG. 5 is a schematic block diagram to describe a structure of a cellular phone 100 of FIG. 1.

In cellular phone 100, the natural number x representing the type (class) of the content reproduction circuit of cellular phone 100 is set to x=1.

Cellular phone 100 includes an antenna 1102 to receive a signal transmitted through radio by a cellular phone network, a transmitter/receiver unit 1104 converting the signal received from antenna 1102 into a base band signal, or modulating and providing to antenna 1102 the data from cellular phone 100, a data bus BS2 to transfer data between respective components of cellular phone 100, and a controller 1106 to control the operation of cellular phone 100 via data bus BS2.

Cellular phone 100 further includes a touch key unit 1108 to apply designation to cellular phone 100 from an external source, a display 1110 to apply the information output from controller 1106 or the like to the user as visual information, an audio reproduction unit 1112 reproducing audio based on reception data provided via data bus BS2 in a general conversation operation, a connector 1120 to transfer data with an external source, and an external interface unit 1122 providing the data from connector 1120 to data bus BS2 for conversion, or to convert the data from data bus BS2 into a signal that can be applied to connector 1120.

Cellular phone further includes a detachable memory card 110 storing encrypted music data (encrypted content data), and storing information used for a decryption process, a memory interface 1200 to control data transfer between memory card 110 and data bus BS2, an authentication data hold unit 1500.1 storing a public encryption key KPp(1) set for each cellular phone class in an encrypted state that can be decrypted using authentication key KPma, an authentication data hold unit 1500.2 storing public encryption key KPp(1) in an encrypted state that can be decrypted using authentication key KPmb, and a switch circuit SW1 selectively applying to bus BS2 the data from authentication data hold unit 1500.1 and authentication data hold unit 1500.2 under control of controller 1106.

As described before, since the number of authentication keys operated in the system increases over the period of time in the distribution system, an authentication data hold unit 1500.m (m: natural number) is to be added accordingly.

Cellular phone 100 further includes a Kp hold unit 1502 storing Kp(1) which is a secret encryption key unique to the cellular phone (content reproduction circuit), a decryption processing unit 1504 decrypting data received from data bus BS2 using private decryption key Kp(1), and obtaining session key Ks3 generated by the memory card, a session key generation unit 1508 generating using a random number a session key Ks4 used to encrypt data transferred on data bus BS2 with memory card 110 in a session of reproducing content data stored in memory card 110, an encryption processing unit 1506 encrypting generated session key Ks4 using a session key Ks3 obtained by decryption processing unit 1504 for output onto data bus BS2, and a decryption processing unit 1510 decrypting the data on data bus BS2 using session key Ks4, and providing content decryption key Kc and reproduction circuit control information AC2.

Cellular phone 100 further includes a decryption processing unit 1516 receiving encrypted content data {Data}Kc from data bus BS2 to decrypt the data using content decryption key Kc obtained by decryption processing unit 1510 to output content data, a music reproduction unit 1518 to receive the output of decryption processing unit 1516 to reproduce content data, a mixer unit 1525 receiving the outputs of music reproduction unit 1518 and audio reproduction unit 1112 to selectively provide an output according to the operation mode, and a connection terminal 1530 receiving the output of mixer unit 1525 for connection to headphone 130.

Here, reproduction circuit control information AC2 output from decryption processing unit 1510 is applied to controller 1106 via data bus BS2.

In FIG. 5, only the blocks associated with distribution and reproduction of music data among the blocks forming the cellular phone are illustrated for the sake of simplification. Blocks related to the general conversation function inherent to a cellular phone are left out.

[Configuration of Memory Card 110]

Figure 6:
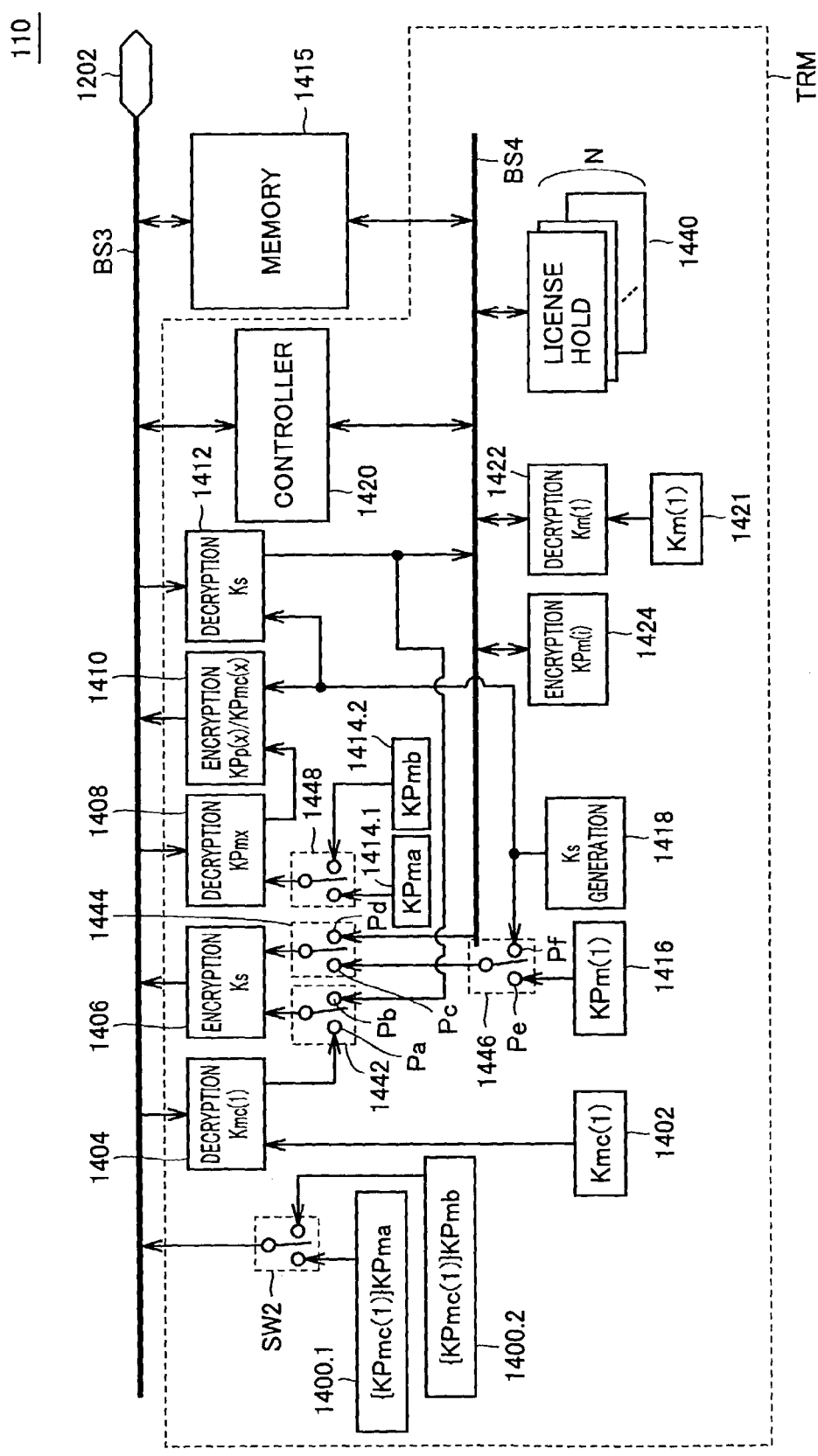
FIG. 6 is a schematic block diagram to describe a structure of a memory card 110 of FIG. 5.

FIG. 6 is a schematic block diagram to describe a structure of memory card 110 of FIG. 5.

As described before, public encryption key KPm(i) and a corresponding private decryption key Km(i) take unique values for each memory card. In memory card 110, it is assumed that the natural number is set to i=1. Also, KPmc(x) and Kmc(x) are set as the public encryption key and secret encryption key unique to the memory card type (class). In memory card 110, it is assumed that natural number x is represented as x=1.

Memory card 110 includes a data bus BS3 to transfer a signal with memory interface 1200 via a terminal 1202, an authentication data hold unit 1400.1 to store {KPmc(1)}KPma as authentication data, an authentication data hold unit 1400.2 storing {KPmc(1)}KPmb as authentication data, a switch circuit SW2 selectively applying onto data bus BS3 the outputs from authentication data hold unit 1400.1 and authentication data hold unit 1400.2 under control of controller 1420, a Kmc hold unit 1402 storing a decryption key Kmc(1) which is a decryption key unique set for each memory card type, a Km(1) hold unit 1421 storing private decryption key Km(1) set unique to each memory card, and a KPm(1) hold unit 1416 to store public encryption key KPm(1) to carry out encryption that can be decrypted using private decryption key Km(1).

Here, authentication data hold unit 1400.1 stores public encryption key KPmc(1) set for each memory card class in an encrypted state that can be authenticated by decryption using authentication key KPma in an authenticatable state. Authentication data hold unit 1400.2 stores public encryption key KPmc(1) in an encrypted state that can be authenticated by decryption using authentication key KPmb. When the number of authentication keys increases according to the operation duration of the system, an authentication data hold unit 1400.m (m: natural number, m>2) is additionally provided accordingly.

Memory card 110 further includes a decryption processing unit 1404 receiving data applied from memory interface 1200 to data bus BS3, and receiving a private decryption key Kmc(1) from Kmc(1) hold unit 1402 unique to each memory card type, and providing to contact Pa a session key Ks1 generated by distribution server 30 in a distribution session or a session key Ks3 generated in a transfer session by another memory card, authentication key hold units 1444.1 and 1444.2 to store authentication keys KPma and KPmb, respectively, a switch circuit 1448 receiving authentication key KPma from authentication key hold unit 1444.1 and authentication key KPmb from authentication key hold unit 1444.2 to selectively output the received key according to control of controller 1420, a decryption processing unit 1408 receiving the output of switch circuit 1448 to execute a decryption process using authentication data KPma or KPmb from the data applied onto data bus BS3 and providing the decrypted result to controller 1420 and encryption processing unit 1410 via data bus BS4, and an encryption processing unit 1406 encrypting data selectively applied from switch 1444 using a key selectively applied by switch 1442, and providing the encrypted data onto data bus BS3.

When the number of authentication keys increases according to the operation period of the system, an authentication key hold unit 1400.m (m: natural number, m>2) is additionally provided accordingly.

Memory card 110 further includes a session key generation unit 1418 generating a session key Ks2 or Ks3 at each distribution, reproduction and transfer session, an encryption processing unit 1410 encrypting session key Ks3 output from session key generation unit 1418 using public encryption key KPp(x) or KPmc(x) obtained by encryption processing unit 1408 to output the encrypted key to data bus BS3, and a decryption processing unit 1412 receiving data encrypted by session key Ks2 or Ks3 from data bus BS3 to apply a decryption process using session key Ks2 or Ks3 obtained by session key generation unit 1418, and providing the decrypted result onto data bus BS4.

Memory card 110 further includes an encryption processing unit 1424 encrypting the data on data bus BS4 using a public encryption key KPm(i) (i≠1) unique to another memory card, a decryption processing unit 1422 to decrypt the data on data bus BS4 using a private decryption key Km(1) unique to memory card 110 that is the companion to public encryption key KPm(1), and a memory 1415 receiving and storing from data bus BS4 reproduction information encrypted with public encryption key KPm(l) (content decryption key Kc, content ID, license ID access control information AC1, reproduction circuit control information AC2), as well as receiving and storing via data bus BS3 encrypted content data {Data}Kc and additional data Data-inf. Although not limited, memory 1415 is formed of a semiconductor memory such as a flash memory.

Memory card 110 further includes a license hold unit 1440 storing license ID, content ID and access restriction information AC1 obtained by decryption processing unit 1422, and a controller 1420 transferring data with an external source via data bus BS3 to receive reproduction information and the like from data bus BS4 to control the operation of memory card 110.

License hold unit 1440 can send/receive the data of license ID, data content ID data and access restriction information AC1 to/from data bus BS4. License hold unit 1440 includes N (N: natural number) banks. A portion of the reproduction information corresponding to each license is stored for each bank.

License hold unit 1440 is recorded with information related to inhibiting usage of an authentication key transmitted through a distribution server, if necessary.

It is assumed that the region enclosed by a dotted line in FIG. 6 is incorporated in a module TRM to disable readout of data and the like in the circuit located in that region by a third party by erasing the internal data or destroying the internal circuitry when an improper open process is conducted from an external source. Such a module is generally a tamper resistant module.

A structure may be implemented in which memory 1415 is also incorporated module TRM. However, since the data stored in memory 1415 is completely encrypted according to the structure shown in FIG. 6, a third party will not be able to reproduce the music with just the data in memory 1415. Furthermore, it is not necessary to provide memory 1415 in the expensive tamper resistance module. Thus, there is the advantage that the fabrication cost is reduced.

Alternatively, the entire reproduction information may be stored in license hold unit 1440. In this case, the reproduction information encrypted with public key KPm(1) does not have to be recorded in memory 1415.

[Distribution Operation]

The operation in each session of the data distribution system according to the first embodiment of the present invention will be described in detail hereinafter with reference to the flow charts.

Figure 7:
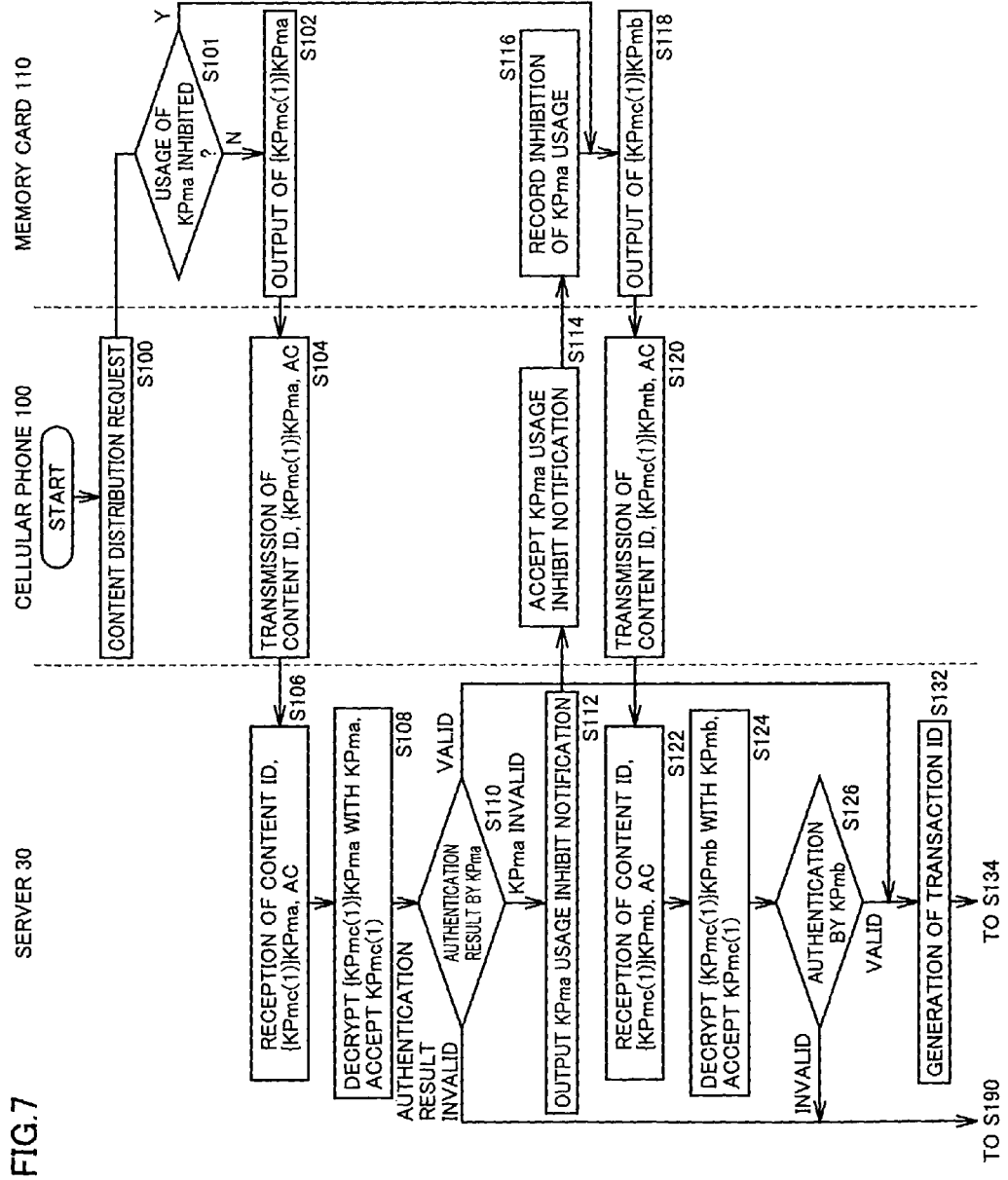
FIG. 7 is a first flow chart to describe the distribution operation in the event of purchasing content in the data distribution system according to a first embodiment.
Figure 8:
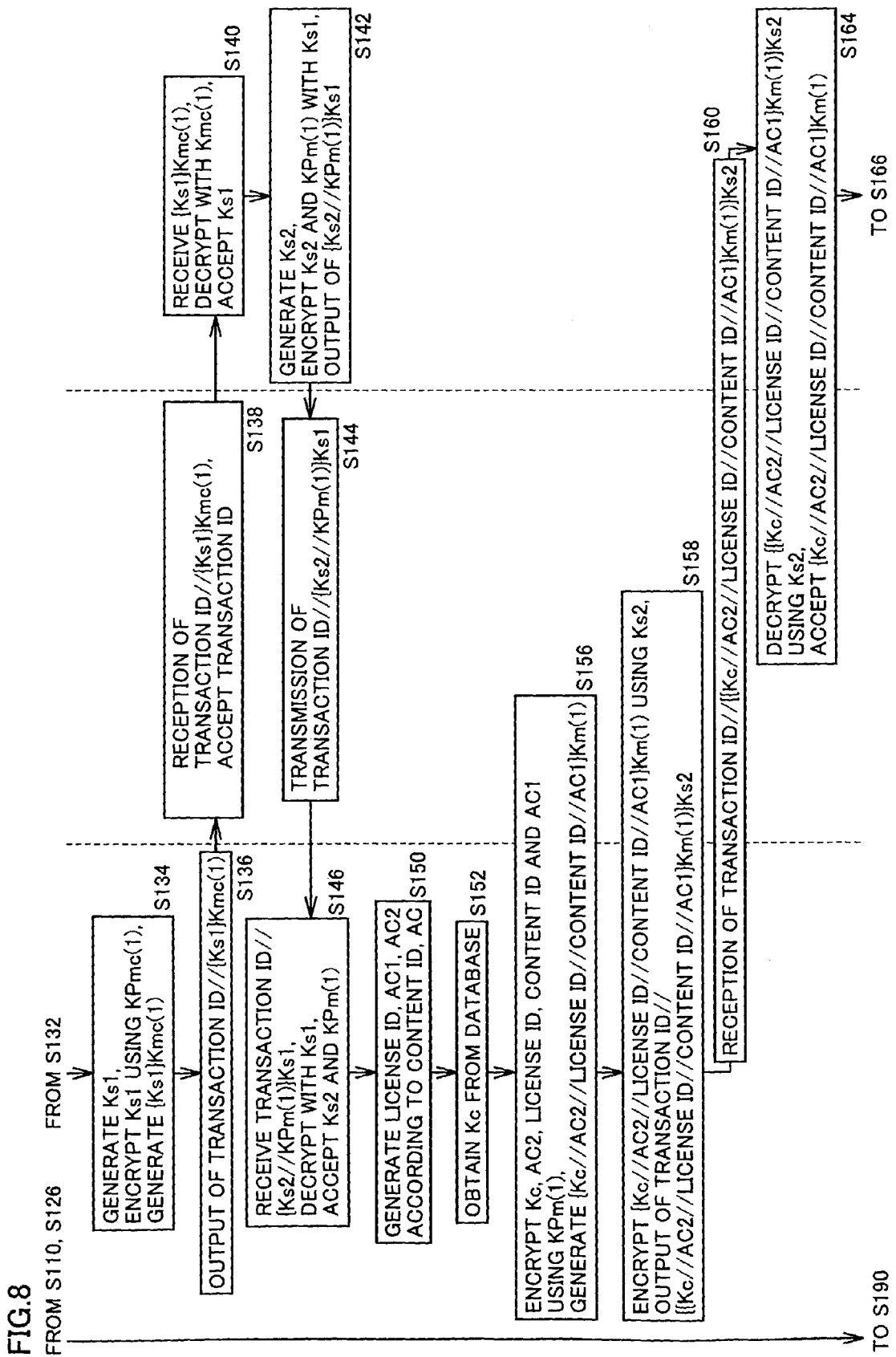
FIG. 8 is a second flow chart to describe the distribution operation in the event of purchasing content in the data distribution system according to the first embodiment.
Figure 9:
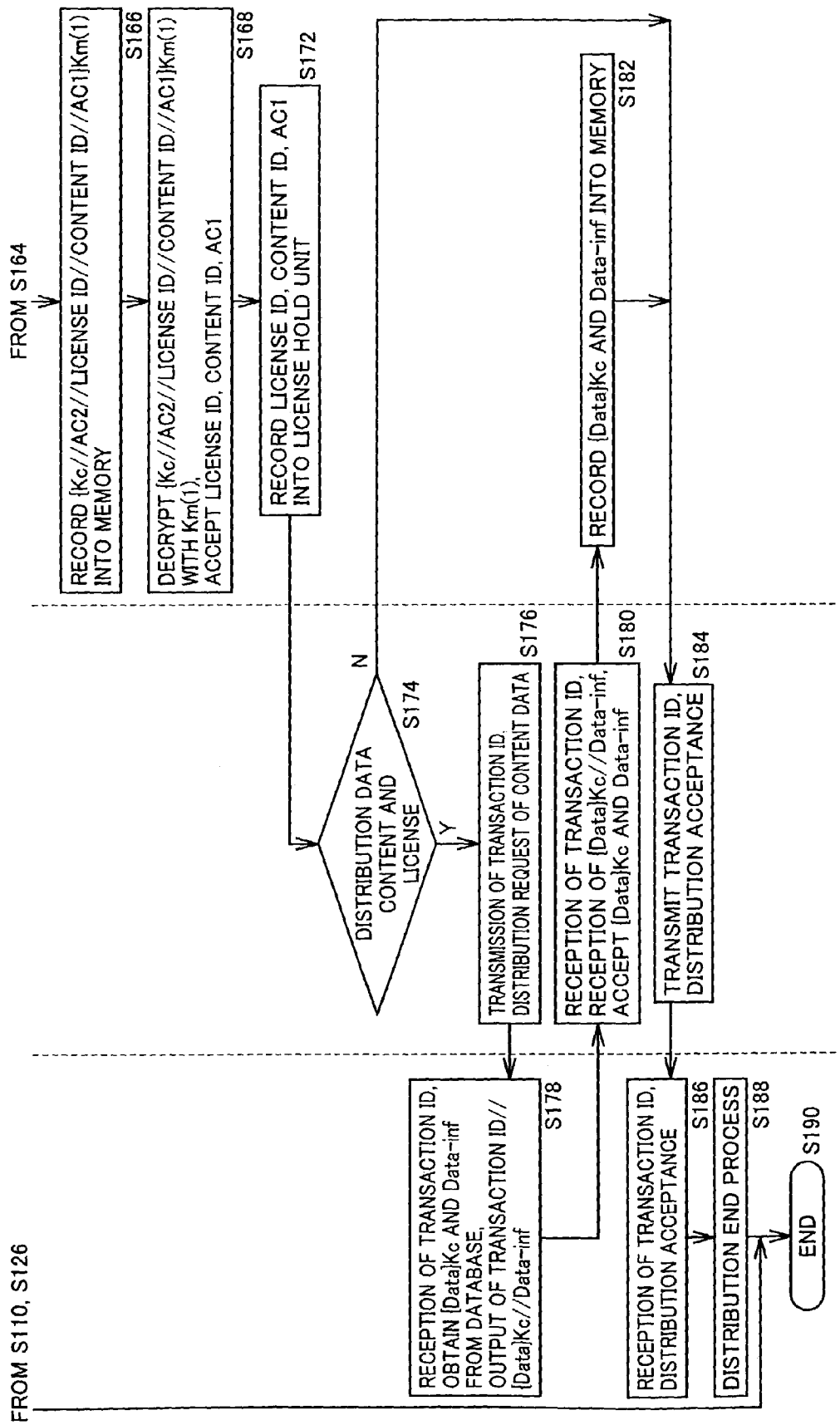
FIG. 9 is a third flow chart to describe the distribution operation in the event of purchasing content in the data distribution system according to the first embodiment.

FIGS. 7, 8 and 9 are the first, second and third flow charts, respectively, to describe a distribution operation in the event of purchasing content according to the data distribution system of the first embodiment (also called "distribution session" hereinafter).

FIGS. 7, 8 and 9 correspond to the operation of user 1 receiving content data distribution from distribution server 30 via cellular phone 100 using memory card 110.

First, a distribution request is issued from cellular phone 100 of user 1 through the operation of the key buttons on touch key unit 1108 by user 1 (step S100).

At memory card 110, determination is made whether usage inhibition for authentication key KPma is recorded in license hold unit 1440 in response to this distribution request (step S101). When usage inhibition for authentication key KPma is not specified, control proceeds to step S102. When usage inhibition is specified, control proceeds to step S118.

When usage inhibition of authentication key KPma is not specified, authentication data {KPmc(1)}KPma is output from authentication data hold unit 1400.1 (step S102). In the case where there is no record in memory card 110 that authentication key KPma has been broken by a third party from the start of the system operation, usage of authentication key KPma is not inhibited. This processing path is selected.

Cellular phone 100 transmits to distribution server 30 the content ID to specify the content data to be distributed and data AC of the license purchase condition in addition to authentication data {KPmc(1)}KPma from memory card 110 (step S104).

Distribution server 30 receives the content ID, authentication data {KPmc(1)}KPma, license purchase condition data AC from cellular phone 100 (step S106). Decryption processing unit 312 executes a decryption process using authentication key KPma. Accordingly, distribution server 30 receives public encryption key KPmc(1) of memory card 110 (step S108).

Distribution control unit 315 conducts authentication by authentication server 12 based on the received secret encryption key KPmc(1) and authentication data KPma (step S110). When determination is made that public encryption key KPmc(1) encrypted with authentication key KPma is properly registered and the authentication result based on authentication key KPma is valid as a result of proper encryption (step S110), control proceeds to step S132.

When public encryption key KPmc(1) encrypted using authentication key KPma is unauthorized and not subjected to proper encryption (step S110), the process ends based on the determination that the authentication result is invalid (step S190).

When determination is made that authentication key KPma has already been broken by a third party and is invalid as a result of authentication by authentication server 12 (step S110), distribution server 30 outputs "authentication key KPma usage inhibit notification" (step S112). In response to cellular phone 100 receiving the authentication key KPma usage inhibit notification (step S114), authentication key KPma usage inhibition is recorded in license hold unit 1440 of memory card 110 (step S116).

Then, authentication data {KPmc(1)}KPmb is output from authentication data hold unit 1400.2 (step S118).

Cellular phone 100 transmits to distribution server 30 the content ID to specify the content to receive distribution, and license purchase condition data AC in addition to authentication data {KPmc(1)}KPmb received from memory card 110 (step S120).

Distribution server 30 receives the content ID, authentication data {KPmc(1)}KPmb and license purchase condition data AC from cellular phone 100 (step S122). Decryption processing unit 312 executes a decryption process with authentication data KPma. Accordingly, distribution server 30 accepts public encryption key KPmc(1) of memory card 110 (step S124).

Distribution control unit 315 conducts authentication through authentication server 12 based on the accepted secret encryption key KPmc(1) and authentication key KPmb (step S126). In the case public encryption key KPmc(1) encrypted using authentication key KPmb is properly registered and determination is made that the authentication result using authentication key KPmb is valid as a result of proper encryption (step S110), control proceeds to step S132.

When public encryption key KPmc(1) encrypted using authentication key KPmb is not properly registered so that proper encryption is not effected, or when authentication key KPmb has already been broken by a third party and rendered invalid (step S126), the process ends based on the determination that the authentication result is invalid (step S190).

In verifying authenticity of public encryption key KPmc(1) in the decryption process by authentication key KPma, a certificate encrypted so as to be able to be decrypted using authentication key KPma or KPmb may be transmitted to distribution server 30 accompanying each public encryption key KPmc(1).

When authenticity of memory card 110 is verified as a result of the above authentication, distribution control unit 315 generates a transaction ID to identify the distribution session (step S132).

Referring to FIG. 8, session key generation unit 316 generates a session key Ks1 for distribution. Session key Ks1 is encrypted by encryption processing unit 318 using public encryption key KPmc(1) corresponding to memory card 110 obtained by decryption processing unit 312 (step S134).

The transaction ID and encrypted session key {Ks1}Kmc(1) are output via data bus BS1 and communication device 350 (step S136).

In response to cellular phone 100 receiving the transaction ID and encrypted session key {Ks1}Kmc(1) (step S138), the encrypted session key {Ks1}Kmc(1) is input to memory card 110. At memory card 110, decryption processing unit 1404 decrypts the reception data applied onto data bus BS3 via memory interface 1200 using a private decryption key Kmc(1) unique to the class of memory card 110 stored in storage unit 1402, whereby session key Ks1 is decrypted and extracted (step S140).

In response to reception of session key Ks1 generated by distribution server 30, controller 1420 designates session key generation unit 1418 to generate a session key Ks2 during a distribution session of memory card 110.

Encryption processing unit 1406 uses session key Ks1 applied from decryption processing unit 1404 via contact Pa of switch 1422 to encrypt session key Ks2 and public encryption key KPm(1) unique to each memory card applied via contacts Ke and Kf, respectively, by switching the contact of switch 1446 to output {Ks2//KPm(1)}Ks1 to data bus BS3 (step S142).

Data {Ks2//KPm(1)}Ks1 output onto data bus BS3 is transmitted from data bus BS3 to cellular phone 100 via terminal 1202 and memory interface 1200 (step S142). Cellular phone 100 adds the transaction ID, and transmits the data and a transaction ID to distribution server 30 (step S144).

The expression of {X//Y}Z implies encrypted data X and Y that can be decrypted using key Z.

Distribution server 30 receives a transaction ID and encrypted data {Ks2//KPm(1)}Ks1. At decryption processing unit 320, a decryption process is executed using session key Ks1. Session key Ks2 generated at the memory card and public encryption key KPm(1) unique to memory card 110 are accepted (step S146).

Distribution control unit 315 generates a license ID, access restriction information AC1 and reproduction circuit control information AC2 according to the content ID and license purchase condition data AC obtained at step S106 (step S150). Also, content decryption key Kc to decrypt the encrypted content data is obtained from information database 304 (step S152).

Distribution control unit 315 has content decryption key Kc, reproduction circuit control information AC2, the license ID, content ID and access restriction information AC1 encrypted by encryption processing unit 326 using public encryption key KPm(1) unique to memory card 110 obtained by decryption processing unit 320 (step S156).

Encryption processing unit 328 receives the output of encryption processing unit 326 to encrypt the output using session key Ks2 generated at memory card 110. A transaction ID is attached to encrypted data {{Kc//AC2//license ID//content ID//AC1}Km(1)}Ks2 output from encryption processing unit 328, and transmitted to cellular phone 100 via data bus BS1 and communication device 350 (step S158).

By transferring respective session keys generated at distribution server 30 and memory card 110 to each other to execute encryption using respective received encryption keys and transmitting the encrypted data to the other party, authentication of each other can be virtually conducted in the transmission/reception of respective encrypted data. Thus, security of the data distribution system can be improved.

Cellular phone receives the transmitted transaction ID and encrypted data {{Kc//AC2//license ID//content ID//AC1}Km(1)}Ks2 (step S160). The received encrypted data is applied to memory card 110. At memory card 110, the encrypted data applied onto data bus BS3 via memory interface 1200 is decrypted by decryption processing unit 1412. Specifically, decryption processing unit 1412 uses session key Ks2 applied from session key generation unit 1418 to decrypt the reception data on data bus BS3, and provides the decrypted data onto data bus BS4 (step S164).

Referring to FIG. 9, data {Kc//AC2//license ID//content ID//AC1}Km(1) output on data bus BS4 is recorded in memory 1415 outside the TRM region (step S166).

Data {Kc//AC2//license ID//content ID//AC1}Km(1) output to data bus BS4 and that can be decrypted using private decryption key Km(1) stored in Km(1) hold unit 1421 is decrypted by decryption processing unit 1422 using private decryption key Km(1) in response to designation by controller 1420. Content decryption key Kc, reproduction circuit control information AC2, the license ID, content ID and access restriction information AC1 are accepted (step S168).

The license ID, content ID and access restriction information AC1 are recorded in bank j that is the j-th empty bank in license hold unit 1440 (step S172). Here, natural number j is the number corresponding to the content data, where $1 \leq j \leq N$ (N: total number of banks).

When the process up to step S152 ends properly, designation of whether to obtain distribution of reproduction information such as the content decryption key as well as encrypted content data, or only the reproduction information such as the content decryption key, is issued from user 1 to cellular phone 100 (step 174).

In the case where distribution of both reproduction information and content data is desired, a content data distribution request and a transaction ID are transmitted from cellular phone 100 to distribution server 30 (step S176). When the distribution of only license information such as the content decryption key is desired, control proceeds to step S184.

Upon receiving a content data distribution request, distribution server 30 obtains encrypted content data {Data}Kc and additional data DATA-inf from information database 304. A transaction ID is attached to the same, and output via data bus BS1 and communication device 350 (step S178).

Cellular phone 100 receives {Data}Kc//Data-inf//transaction ID, and accepts encryption content data {Data}Kc and additional data Data-inf (step S180). Encrypted content data {Data}Kc and additional data Data-inf are transmitted to data bus BS3 of memory card 110 via memory interface 1200 and terminal 1202. At memory card 110, the received encrypted content data {Data}Kc and additional data Data-inf are directly stored in memory 1415 (step S182).

A transaction ID distribution reception notification is issued from cellular phone 100 to distribution server 30 (step S184). Upon receiving the transaction ID distribution reception at distribution server 30 (step S186), the distribution end process is executed with storage of the accounting data into account database 302 (step S188), and the entire process ends (step S190).

By virtue of the above-described process, content data. can be distributed only when authenticity of public encryption key KPmc(1) transmitted by memory card 110 of cellular phone 100 in response to a distribution request is verified. Distribution to an improper apparatus can be inhibited. Thus, security of distribution is improved.

A transaction ID is assigned to a series of transmission/reception, and used to identify the communication in the same distribution. Although not particularly described, the process will end when correspondence of the transaction ID is not established.

[Reproduction Operation]

The operation of reproducing music from the encrypted content data stored in memory card 110 to output the music through cellular phone 100 (also called "reproduction session" hereinafter) will be described.

Figure 10:
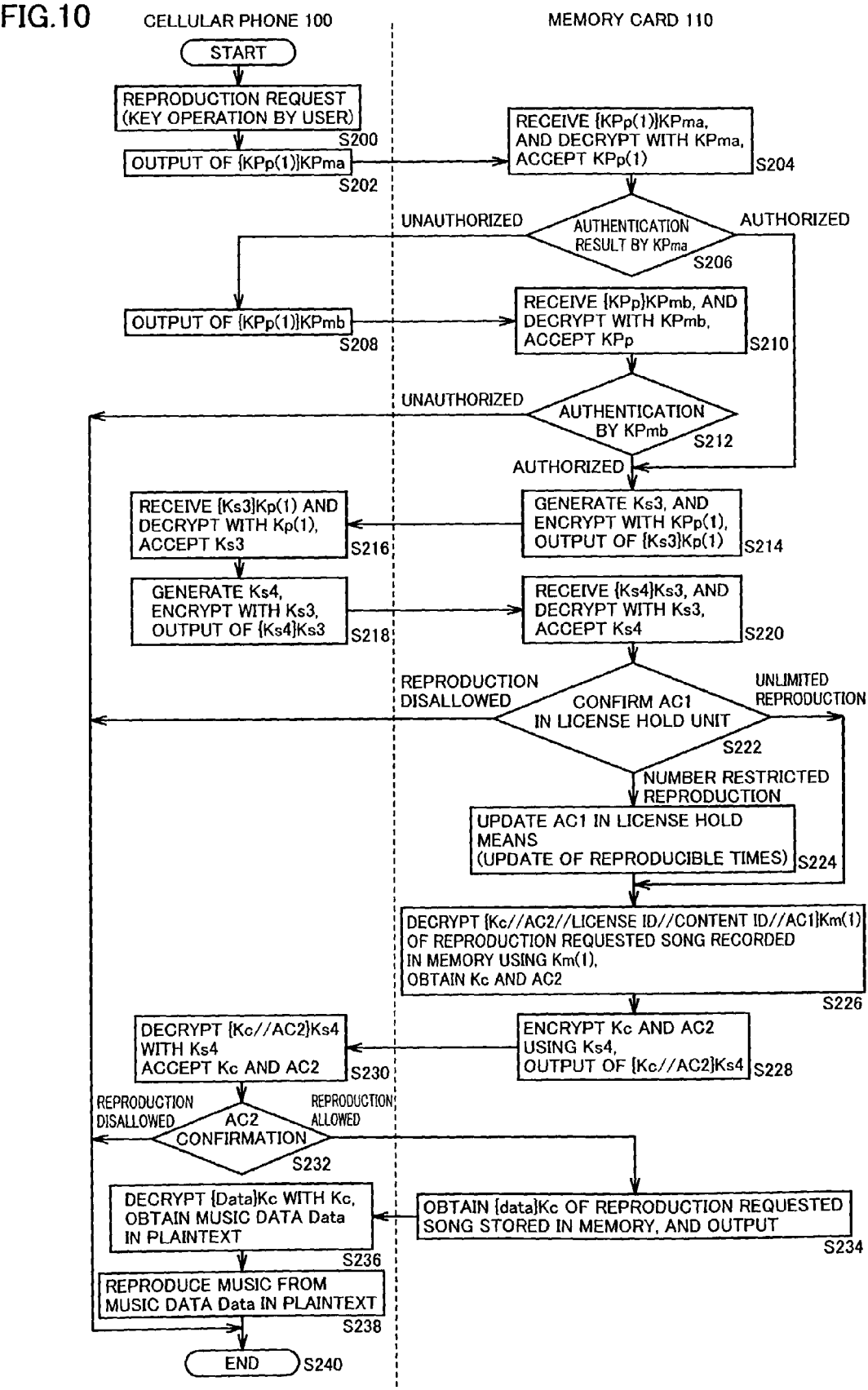
FIG. 10 is a flow chart to describe the operation of each component in a reproduction session.

FIG. 10 is a flow chart to describe the operation of each component in a reproduction session.

Referring to FIG. 10, a reproduction request is issued by designation of user 1 through touch key unit 1108 or the like of cellular phone 100 (step S200).

In response to the generation of a reproduction request, cellular phone 100 outputs onto data bus BS2 authentication data {KPp(1)}KPma that can be decrypted using authentication key KPma from authentication data hold unit 1500.1 (step S202).

Authentication data {KPp(1)}KPma is transmitted to memory card 110 via data bus BS2 and memory interface 1200.

At memory card 110, authentication data {KPp(1)}KPma transmitted onto data bus BS3 via terminal 1202 is fetched by decryption processing unit 1408. Decryption processing unit 1408 receives authentication key KPma from authentication key hold unit 1414.1 to decrypt the data on data bus BS3. The decrypted public secret key KPp(1) is accepted (step S204).

When public encryption key KPp(1) encrypted using authentication key KPma is properly registered, and subjected to proper encryption, i.e., when decryption using authentication key KPma is allowed and associated data generated at the time of decryption can be confirmed, and when the authentication key is not recorded as inhibited of usage in license hold unit 1440 (step S206), the process proceeds to step S214 on the assumption that the authentication result through authentication key KPma has been verified.

When decryption is disallowed, or when associated data generated during decryption cannot be confirmed or the authentication key is inhibited of usage (step S206), determination is made that the authentication result through authentication key KPma is not verified, and the result is issued to cellular phone 100.

When the authentication result through authentication key KPma is not verified, cellular phone 100 has authentication data {KPp(1)}KPmb that can be decrypted using authentication key KPmb output from authentication key hold unit 1500.2 to data bus BS2 (step S208).

Encryption data {KPp(1)}KPmb for authentication is transmitted to memory card 110 via data bus BS2 and memory interface 1200.

At memory card 110, authentication data {KPp(1)}KPmb transmitted onto data bus BS3 via terminal 1202 is fetched by decryption processing unit 1408. Decryption processing unit 1408 receives authentication key KPmb from authentication key hold unit 1414.2 to decrypt the data on data bus BS3. Then, the decrypted public encryption key KPp(1) is accepted (step S210).

When public encryption key KPp(1) encrypted using authentication key KPmb is properly registered, and subjected to proper encryption, i.e., when decryption using authentication key KPmb is allowed and the associated data generated during decryption can be confirmed, and when the authentication key is not recorded in license hold unit 1440 as inhibited of usage (step S212), determination is made that the authentication result through authentication key KPmb is verified, and control proceeds to step S214.

When decryption is disallowed, or when the associated data generated during decryption cannot be confirmed or the authentication key is inhibited of usage (step S212), determination is made that the authentication result through authentication key KPmb is not verified, and the process ends (step S240).

When controller 1420 receives public encryption key KPp(1) unique to the content reproduction circuit of cellular phone 100 at decryption processing unit 1408 and authenticity of the content reproduction circuit of cellular phone 100 is verified as a result of authentication, determination is made that the transmitted public encryption key KPp(1) is the public encryption key assigned to the authorized content reproduction circuit for the data distribution system. Session key generation unit 1418 is instructed to generate session key Ks3 of the reproduction session via data bus BS4. Session key Ks3 generated by session key generation unit 1418 is transmitted to encryption processing unit 1410. Encryption processing unit 1410 encrypts session key Ks3 using public encryption key KPp(1) of cellular phone 100 obtained by decryption processing unit 1408. Encrypted data {Ks3}Kp(1) is output onto data bus BS3 (step S214).

Cellular phone 100 receives encrypted data {Ks3}Kp(1) on data bus BS via terminal 102 and memory interface 1200. Encrypted data {Ks3}Kp(1) is decrypted by decryption processing unit 1504. Session key Ks3 generated at memory card 110 is accepted (step S216).

In response to acceptance of session key Ks3, controller 1106 instructs session key generation unit 1508 to generate session key Ks4 generated at cellular phone 100 in the reproduction session. The generated session key Ks4 is transmitted to encryption processing unit 1506. Data {Ks4}Ks3 encrypted using session key Ks3 obtained by decryption processing unit 1504 is output to data bus BS2 (step S218).

Encrypted session key {Ks4}Ks3 is transmitted to memory card 110 via memory interface 1200. At memory card 110, encrypted {Ks4}Ks3 transmitted to data bus BS3 is decryption by decryption processing unit 1412. Session key Ks4 generated by cellular phone 100 is accepted (step S220).

In response to acceptance of session key Ks4, controller 1420 confirms access restriction information AC1 with the corresponding content ID in license hold unit 1440 (step S222).

By confirming access restriction information AC1 that relates to restriction on memory access at step S222, the reproduction session ends when in a reproduction disable state (step S240). In the case reproduction is allowed but the number of times of reproduction is restricted, the data of access restriction information AC1 is updated and the reproducible number of times is updated. Then, control proceeds to step S226 (step S224). When the number of times of reproduction is not restricted by access restriction information AC1, control skips step S224 and proceeds to step S226 without access control information AC1 being updated.

Determination is made of a reproduction disable state in the case where the relevant content ID corresponding to the requested song is not present in license hold unit 1440, and the reproduction session ends (step S240).

When determination is made that reproduction is allowed in the current reproduction session at step S222, a decryption process is executed to obtain the content decryption key Kc of the requested song and reproduction circuit control information AC2 stored in the memory. Specifically, in response to a command from controller 1420, encrypted data {Kc//AC2//license ID//content ID//AC1}Km(1) read out from memory 1415 to data bus BS4 is decrypted by decryption processing unit 1422 using secret key Km(1). Accordingly, content decryption key Kc and reproduction circuit control information AC2 are obtained (step S226).

The obtained content reproduction key Kc and reproduction circuit control information AC2 are applied to encryption processing unit 1406 via contact Pd of switch 1444. Encryption processing unit 1406 encrypts data Kc and AC2 received from data bus BS4 using session key Ks4 received from decryption processing unit 1412 via contact Pb of switch 1442. Data {Kc//AC2}Ks4 is output onto data bus BS3 (step S228).

The encrypted data output on data bus BS3 is transmitted to cellular phone 100 via memory interface 1200.

At cellular phone 100, encrypted data {Kc//AC2}Ks4 transmitted onto data bus BS2 via memory interface 1200 is decrypted by decryption processing unit 1510 using session key Ks4, whereby content decryption key Kc and reproduction circuit control information AC2 are accepted (step S230). Decryption processing unit 1510 transmits content decryption key Kc to decryption processing unit 1516. Reproduction circuit control information AC2 is output onto data bus BS2.

Controller 1106 accepts reproduction circuit control information AC2 to confirm whether reproduction is allowed or not via data bus BS2 (step S232).

When determination is made that reproduction is not allowed through reproduction circuit control information AC2 at step S232, the reproduction session ends (step S240).

When reproduction is allowed, encrypted content data {Data}Kc of the requested song stored in the memory is output onto data bus BS3 by memory card 110, and transmitted to cellular phone 100 via memory interface 1200 (step S234).

At cellular phone 100, encrypted content data {Data}Kc transmitted onto data bus BS2 from memory card 210 is decrypted by decryption processing unit 1516 using content decryption key Kc, whereby content data in plaintext can be obtained (step S236). The decrypted content data Data of plaintext is reproduced into music by music reproduction unit 1518, and output via mixer unit 1525 and terminal 1530. Thus, the process ends (step S240).

In the reproduction session, respective encryption keys are output from cellular phone 100 and memory card 110 to execute encryption with each other using the received encryption key, and the encrypted data is transmitted to the other party. As a result, authentication can be conducted with each other in respective transmission and reception of data in the reproduction session, as in the distribution session. Thus, security of the data distribution system can be improved.

[Transfer Operation]

The process of transferring content data between two memory cards will be described hereinafter.

Figure 11:
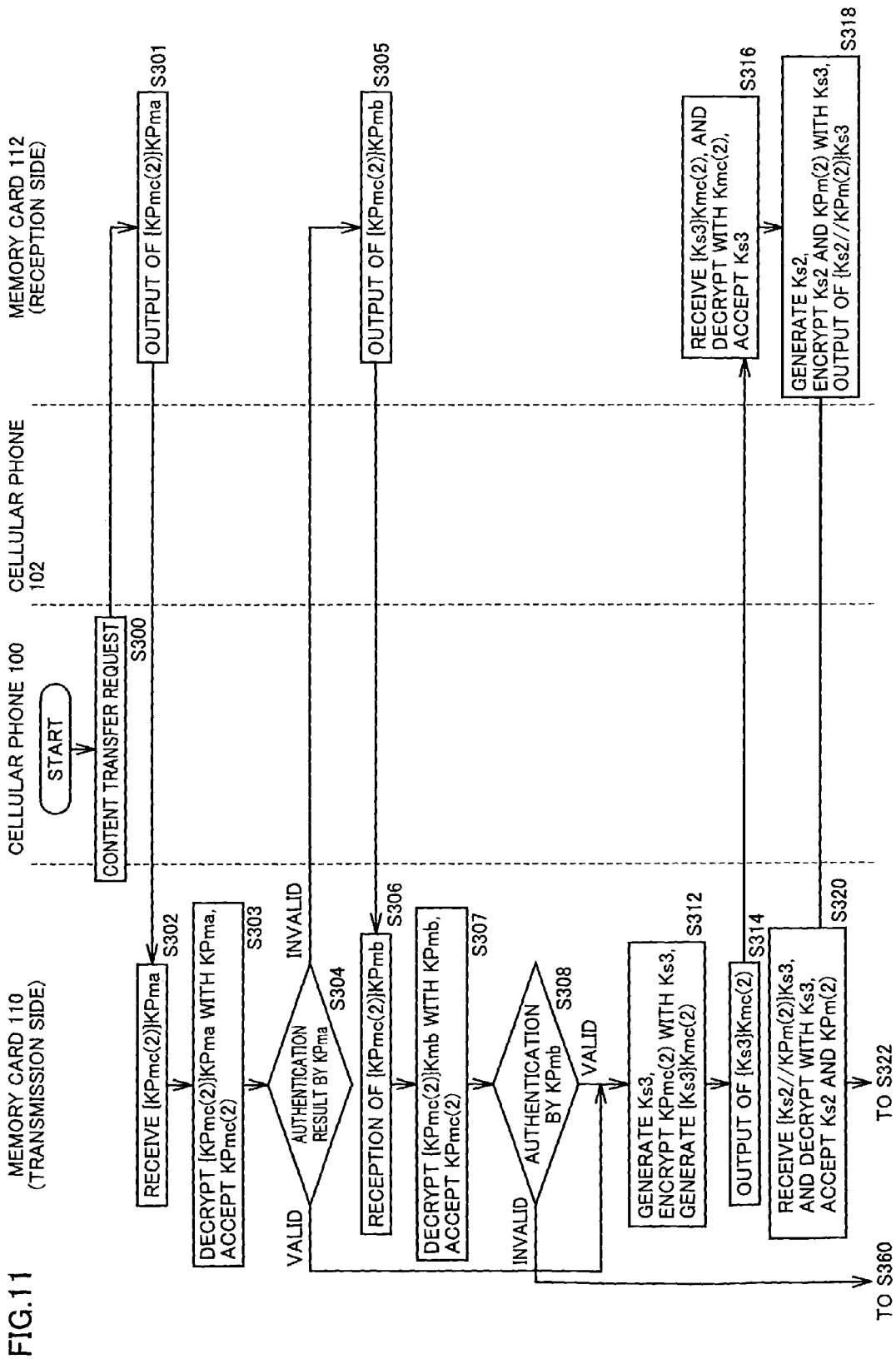
FIG. 11 is a first flow chart to describe the transfer process between two memory cards 110 and 112.
Figure 12:
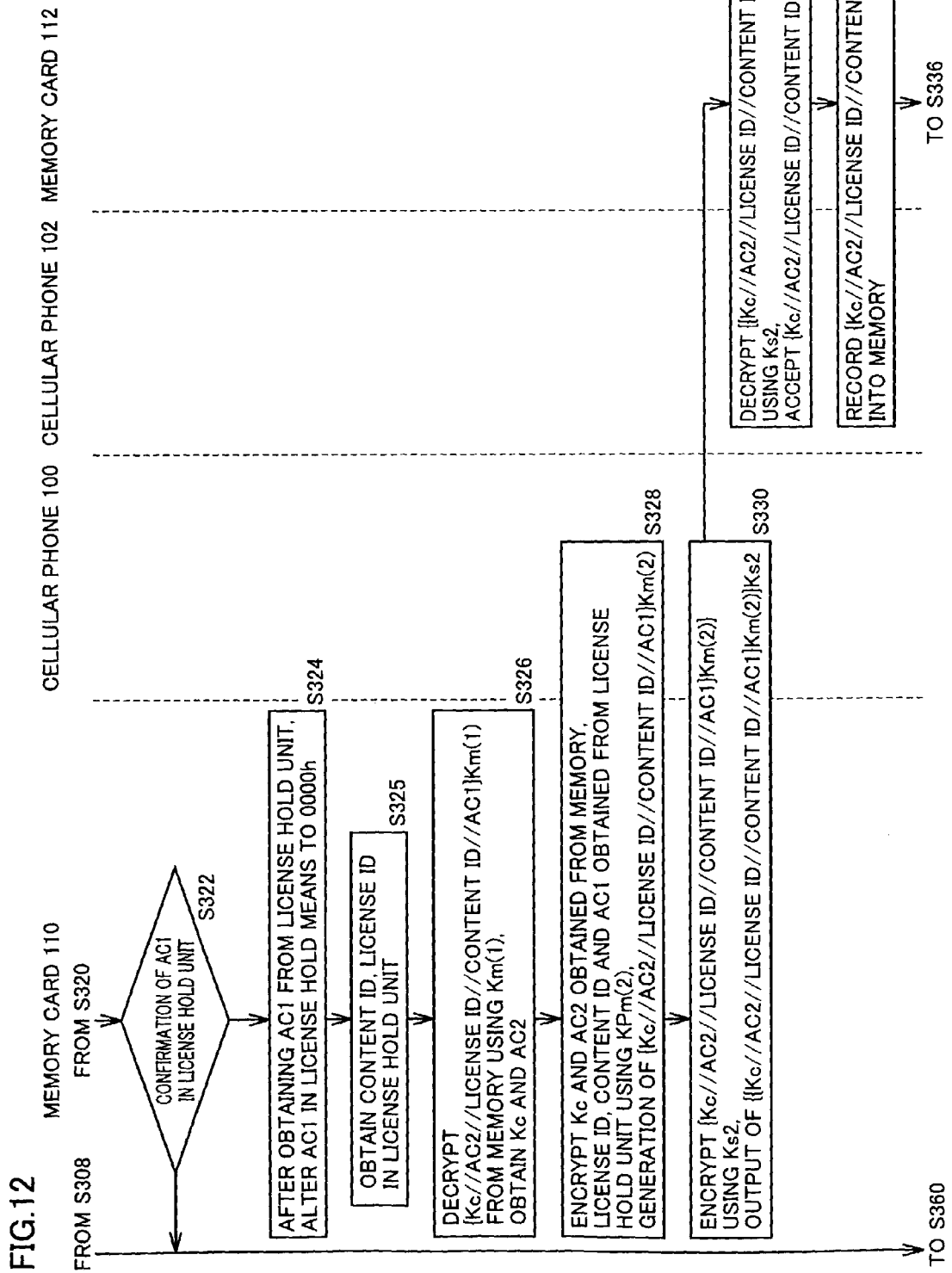
FIG. 12 is a second flow chart to describe the transfer process between two memory cards 110 and 112.
Figure 13:
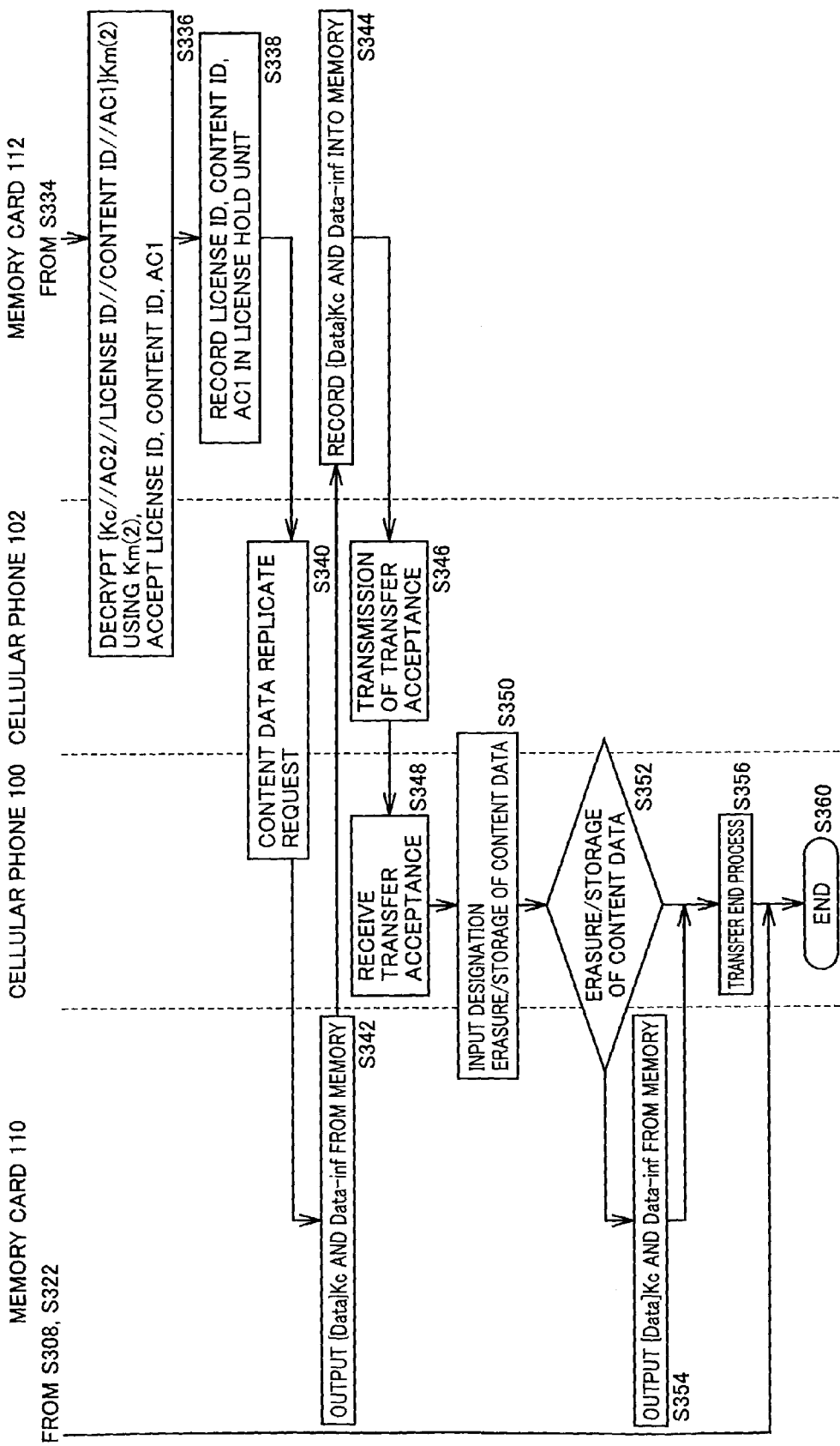
FIG. 13 is a third flow chart to describe the transfer process between two memory cards 110 and 112.

FIGS. 11, 12 and 13 are the first, second and third flow charts, respectively, to describe the process of transferring content data and reproduction information between two memory cards 110 and 112 via cellular phones 100 and 102.

In FIGS. 11-13, the natural number x to identify the types of cellular phone 100 and memory card 110 is set to x=1, and the natural number x to identify the types of cellular phone 102 and memory card 112 is set to x=2. The natural number i to identify memory card 110 and memory card 112 are set to i=1 and i=2, respectively.

It is assumed that, in FIGS. 11-13, cellular phone 100 and memory card 110 correspond to the transmission side whereas cellular phone 102 and memory card 112 correspond to the reception side. It is assumed that a memory card 112 having a structure similar to that of memory card 110 is loaded in cellular phone 102. Components in memory card 112 corresponding to those of memory card 110 have the same reference characters allotted.

Referring to FIG. 11, a content transfer request is issued from cellular phone 100 of user 1 at the transmission side through the operation of the key button on touch key unit 1108 (step S300).

The generated transfer request is transmitted to memory card 112 via cellular phone 120 of user 2 at the reception side. At memory card 112, public encryption key KPmc(2) corresponding to memory card 112 is output as authentication data {KPmc(2)}KPma from authentication data hold unit 1500.1 (step S301).

Authentication data {KPmc(2)}KPma of memory card 112 is transmitted from cellular phone 120 of user 2, and received by memory card 110 of cellular phone 110 of user 1 (step S302).

At memory card 110, decryption processing unit 1408 executes a decryption process. Decrypted public encryption key KPmc(2) is accepted (step S303).

When public encryption key KPmc(2) encrypted using authentication key KPma is properly registered and subjected to proper encryption, i.e., when decryption is allowed using authentication key KPma and associated data generated during decryption can be confirmed and there is no record of inhibiting usage of authentication key KPma at license hold unit 1440, determination is made that the authentication result through authentication key KPma is valid, and control proceeds to step S312 (step S304). When decryption is not allowed, or when associated data generated during description cannot be confirmed or usage of authentication key KPma is inhibited, memory card 112 is notified that the authentication result by authentication key KPma is invalid (step S 04).

When the authentication result by authentication key KPma is invalid, memory card 112 outputs public encryption key KPmc(2) corresponding to memory card 112 as authentication data {KPmc(2)}KPmb from authentication data hold unit 1500.2 (step S305).

Authentication data {KPmc(2)}KPmb of memory card 112 is transmitted from cellular phone 120 of user 2, and received by memory card 110 via cellular phone 110 of user 1 (step S306).

At memory card 110, a decryption process is executed by decryption processing unit 1408, whereby decrypted public encryption key KPmc(2) is accepted (step S307).

When public encryption key KPmc(2) encrypted with authentication key KPmb is registered properly and subjected to proper encryption, i.e. when decryption through authentication key KPmb is allowed and associated data generated during decryption can be confirmed and inhibition of the usage of authentication key KPmb is not recorded in license hold unit 1440, determination is made that the authentication result by authentication key KPmb is valid, and control proceeds to step S312 (step S308). When decryption is not allowed, or when associated data generated during decryption cannot be confirmed or usage of authentication key KPmb is inhibited, determination is made that the authentication result by authentication key KPmb is invalid and the access is fraudulent from an unauthorized apparatus. Thus, the process ends (step S360).

When the authentication result is verified, controller 1420 instructs session key generation unit 1418 to output session key Ks3 generated at the transmission side during the transfer session. Session key Ks3 generated by session key generation unit 1418 is transmitted to encryption processing unit 1410. Encryption processing unit 1410 receives public encryption key KPmc(2) of memory card 112 decrypted by decryption processing unit 1408 at step S306 and encrypts session key Ks3 using public encryption key KPmc(2) (step S312). Encrypted session key {Ks3}Kmc(2) is output onto data bus BS3 (step S314).

Session key {Ks3}Kmc(2) output onto data bus BS3 is transmitted to memory card 112 via memory interface 1200, cellular phone 100 and cellular phone 120.

Memory card 112 receives {Ks3}Kmc(2) output from memory card 110. Decryption processing unit 1404 executes a decryption process using secret encryption key Kmc(2) corresponding to memory card 112, whereby session key Ks3 generated by memory card 110 of the transmission side is accepted (step S316).

In response to reception of session key Ks3, controller 1420 of memory card 112 instructs session key generation unit 1418 to generate session key Ks2 that is to be generated at the reception side in the transfer session. The generated session key Ks2 is transmitted to encryption processing unit 1406 via contact Pf of switch 1446 and contact Pc of switch 1444.

Encryption processing unit 1406 receives session key Ks3 obtained at step S316 from decryption processing unit 1404 to decrypt session key Ks2 and public encryption key KPmc(2) obtained through contact Pc of switch 1444 and switching between contacts Pf and Pe of switch 1446. The encrypted {Ks2//KPm(2)}Ks3 is output onto data bus BS3 (step S318).

Encrypted data {Ks2//KPm(2)}Ks3 output onto data bus BS3 is transmitted to data bus BS3 of memory card 110 via cellular phones 102 and 100.

At memory card 110, encrypted data transmitted onto data bus BS3 is decrypted by decryption processing unit 1412 using session key Ks3, whereby session key Ks2 and public encryption key KPm(2) associated with memory card 112 are accepted (step S320).

In response to reception of session key Ks2 and public encryption key KPm(2), controller 1420 of memory card 110 confirms access restriction information AC1 in license hold unit 1440 (step S322). When transfer of the reproduction information according to access control information AC1 is disabled, the transfer operation ends at this stage (step S360).

When the transfer session is allowed as a result of confirming access control information AC1, control proceeds to step S324. Controller 1420 saves access control information AC1 of license hold unit 1440, and modifies the value in the license hold unit to 0000h (step S324). In response, the process of confirming access control information AC1 is carried out in the reproduction session and transfer session, whereby subsequent respective sessions will be inhibited thereafter. The content data transferred to memory card 112 will no longer be able to be reproduced or transferred again at memory card 110.

Then, controller 1420 obtains the corresponding content ID and license ID from license hold unit 1440 (step S325).

Controller 1420 also designates memory 1415 to output encrypted data {Kc//AC2//license ID//content ID//AC1}Km(1) related to reproduction information including content decryption key Kc corresponding to the transferred content data. The encrypted data {Kc//AC2//license ID//content ID//AC1}Km(1) output from memory 1415 is decrypted by decryption processing unit 1422, whereby Kc and AC2 are obtained on data bus BS4 (step S326).

The license ID and content ID from license hold unit 1440 and the saved access restriction information AC1 obtained at step S325 as well as Kc and AC2 obtained at step S326 are fetched by encryption processing unit 1424 from data bus BS4 to be encrypted. Encryption processing unit 1424 encrypts these data using public encryption key KPm(2)

unique to memory card 112 obtained by decryption processing unit 1412 at step S320 to generate data {Kc//AC2//license ID//content ID//AC1}Km(2) (step S328).

Encrypted data {Kc//AC2//license ID//content ID//AC1}Km(2) output onto data bus BS4 is transmitted to encryption processing unit 1406 via contact Pd in switch 1444. Encryption processing unit 1406 receives via contact Pb of switch 1442 session key Ks2 generated by memory card 112 obtained by decryption processing unit 1412 to encrypt the data received at contact Pd.

Encryption processing unit 1406 provides {{Kc//AC2//license ID//content ID//AC1}Km(2)}Ks2 onto data bus BS3 (step S330). The encrypted data output onto data bus BS3 at step S330 is transmitted to memory card 112 which is the reception side of the transfer session via cellular phones 100 and 102.

At memory card 112, decryption processing unit 1412 applies decryption based on session key Ks2 generated by session key generation unit 1418, whereby {Kc//AC2//license ID//content ID//AC1}Km(2) is accepted (step S332).

Data {Kc//AC2//license ID//content ID//AC1}Km(2) is recorded in memory 1415 not located in module TRM (step S334).

Encrypted data {Kc//AC2//license ID//content ID//AC1}Km(2) encrypted with public encryption key KPm(2) is decrypted by decryption processing unit 1422 using private decryption key Km(2) unique to memory card 112, whereby the license ID, content ID, and access restriction information AC1 are accepted (step S336).

The license ID, content ID, and access restriction information AC1 received at decryption processing unit 1422 are recorded in a bank specified by license hold unit 1440 (step S338).

Thus, in response to the proper end of the process up to step S338 corresponding to the transfer of reproduction information including content decryption key Kc, a content data replicate request is issued via cellular phone 102 (step S340).

The content data replicate request is transmitted to memory card 110 via cellular phone 100. In response, encrypted content data {Data}Kc and additional information Data-inf are output onto data bus BS3 from memory 1415 of memory card 110 (step S342). The data output onto data bus BS3 is transmitted to memory card 112 via memory interface 1200, and cellular phones 100 and 102 to be stored in memory 1415 of memory card 112 (step S344).

Upon completion of the recording of encrypted content data {Data}Kc and additional information Data-inf, transfer acceptance is transmitted via cellular phone 102 (step S346).

Thus, music can be listened through cellular phone 102 based on encrypted content data {Data}Kc and content decryption key Kc recorded in memory card 112 as long as a proper reproduction session is executed by memory card 112 and corresponding cellular phone 102.

At cellular phone 100 of the transmission side, transfer acceptance issued from cellular phone 102 is received (step S348). The user designates whether to erase or retain the content data via touch key 110 (step S350).

In response to designation of content data erasure through touch key unit 1108, the corresponding encrypted content data {Data}Kc and additional information Data-inf are erased from memory 1415 in memory card 110 (step S354). When storage of content data is designated, step S354 is skipped. The transfer process ends at this stage (step S356).

Following transfer process end step S356 corresponding to a normal transfer session, or skipping from steps S308 and S322 when the transfer session has being aborted based on authentication and checking of access control information AC1, the process of the entire transfer session ends (step S360).

The reproduction information such as the corresponding content ID recorded in license storage unit 1440 attains a state similar to that of erasure since access control information AC1 is updated at step S324 and the reproduction session and transfer session are inhibited. The bank recorded with reproduction information of such a state can be overwritten when receiving distribution or transfer of reproduction information corresponding to new content data. Therefore, at step S324, an effect similar to that where all the data in the bank is erased is achieved.

In the state where encrypted content data is recorded and held in memory 1415, accessing distribution server 30 to receive reception of the reproduction information will allow reproduction of the encrypted content data. As a result, the user can listen to the music. The process of distributing only reproduction information is as described above with reference to FIGS. 7-9.

By the above-described structure, encrypted data is transferred after verifying authenticity of the content reproduction circuit (cellular phone) and memory card of the reception side in a transfer session. Therefore, the system security is further improved.

Second Embodiment

Figure 14:
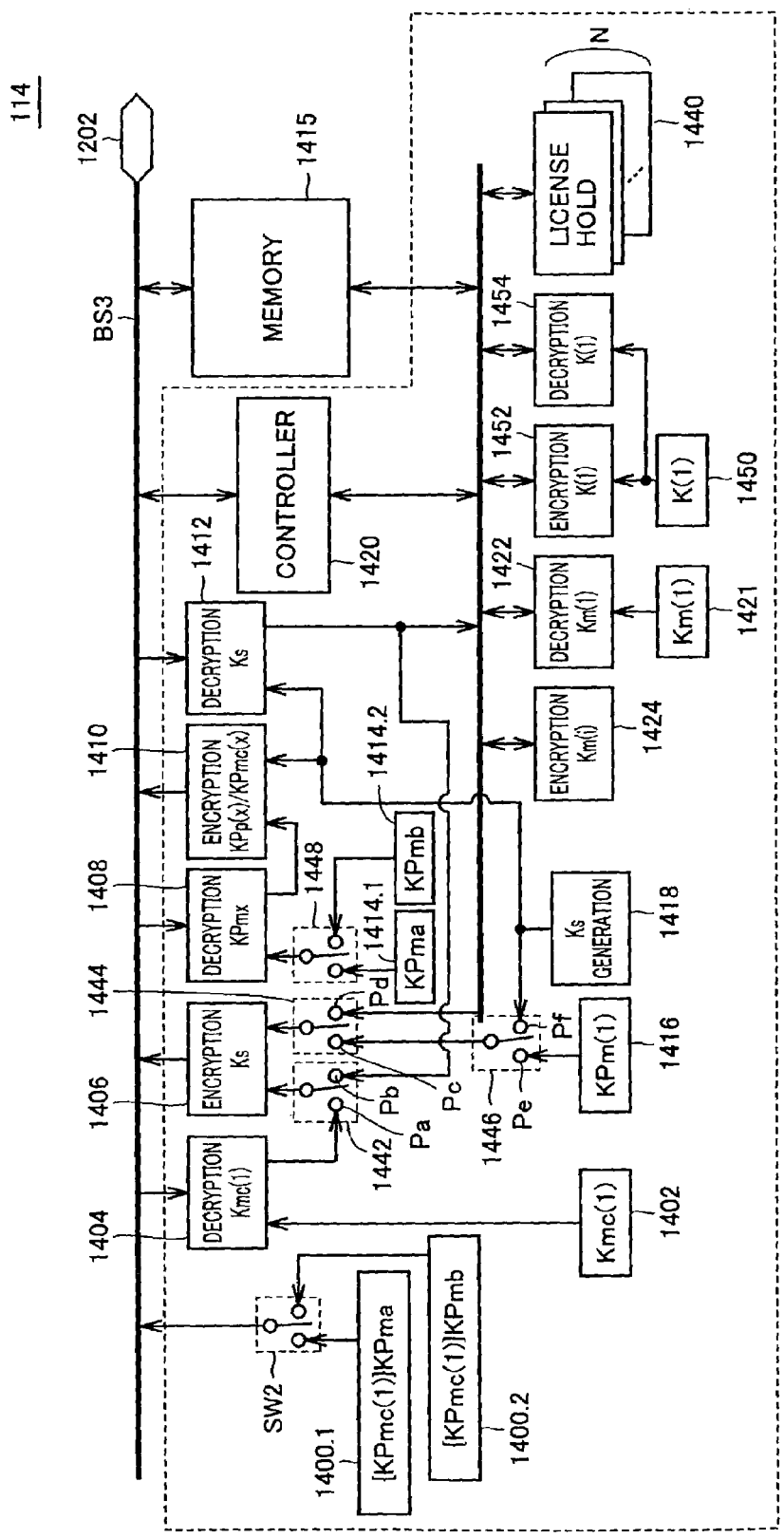
FIG. 14 is a block diagram showing a structure of a memory card 114 according to a second embodiment.

FIG. 14 is a block diagram showing a structure of memory card 114 of the second embodiment, comparable to FIG. 6 of the first embodiment.

Referring to FIG. 14, memory card 114 differs from memory card 110 of the first embodiment shown in FIG. 6 in including a K(1) hold unit storing a secret key K(1) of a symmetric key scheme unique to the memory card, an encryption processing unit 1452 encrypting data on data bus BS4 using secret key K(1), and a decryption processing unit 1454 decrypting data on data bus BS4 using secret key K(1).

The remaining features are similar to those of the structure of memory card 110 of the first embodiment. Corresponding components have the same reference characters, and description thereof will not be repeated.

FIG. 15 is a diagram to describe the property of the keys associated with encryption used in communication and distributing data in the data distribution system of the second embodiment.

The difference in characteristics as to the key and distributing data in the data distribution system of the first embodiment shown in FIG. 2 is that a secret key K(1) unique to the memory card is used. The remaining elements are similar to those of the first embodiment. Therefore, description thereof will not be repeated.

[Distribution Process]

Figure 16:
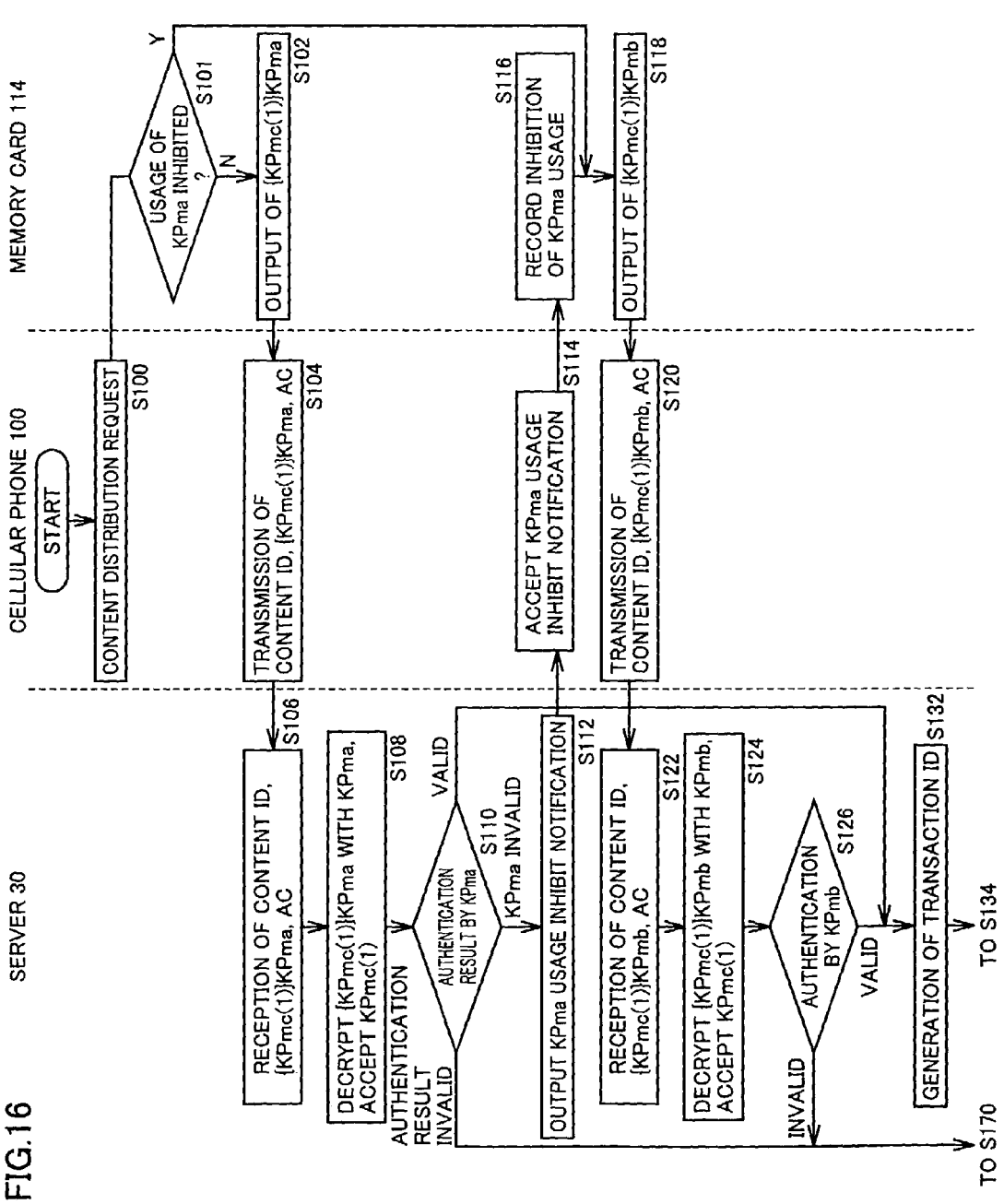
FIG. 16 is a first flow chart to describe the distribution operation in the event of purchasing content in the data distribution system of the second embodiment.
Figure 17:
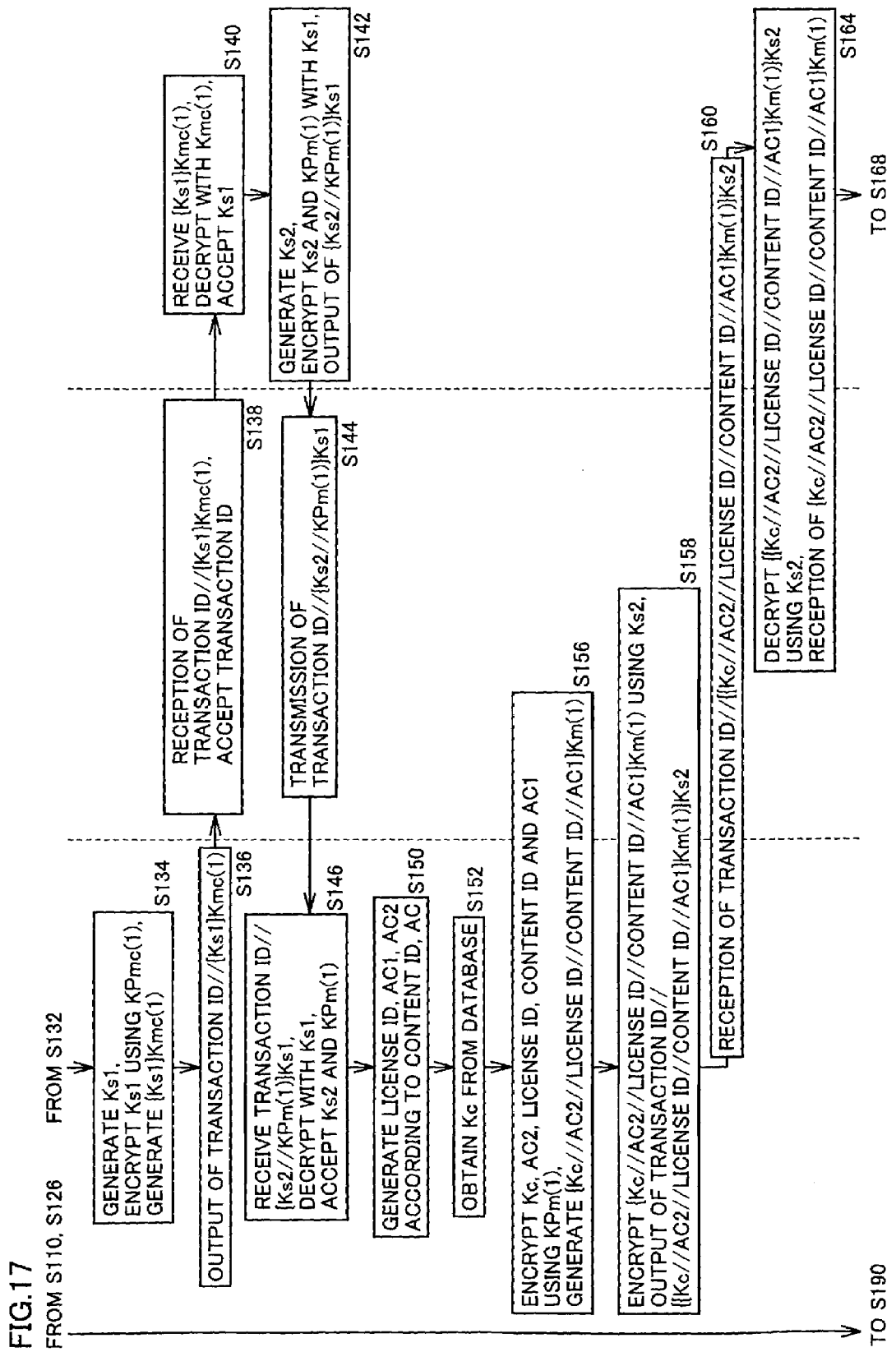
FIG. 17 is a second flow chart to describe the distribution operation in the event of purchasing content in the data distribution system of the second embodiment.
Figure 18:
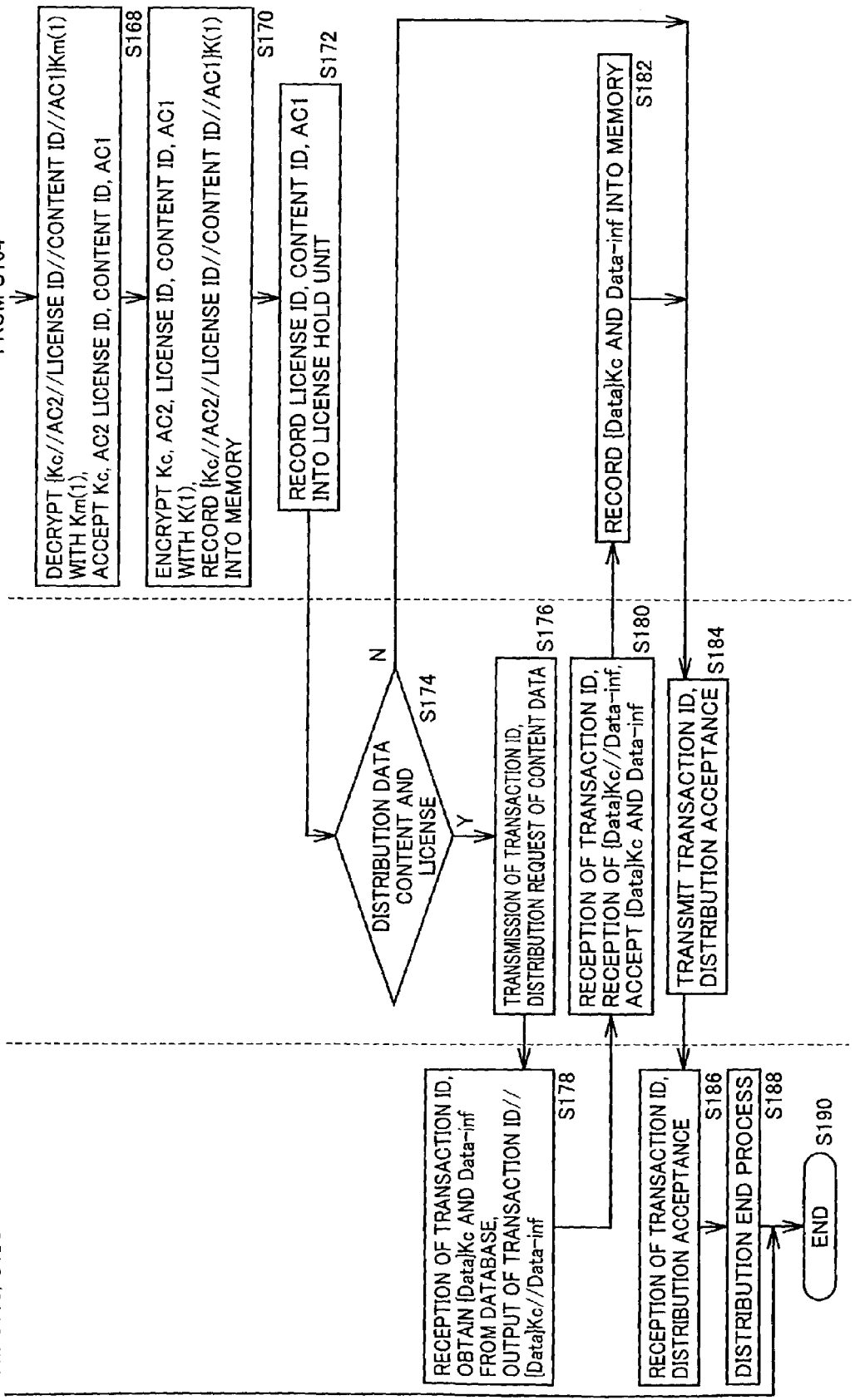
FIG. 18 is a third flow chart to describe the distribution operation in the event of purchasing content in the data distribution system of the second embodiment.

FIGS. 16, 17 and 18 are the first, second and third flow charts, respectively, to describe the distribution operation in the event of purchasing content data in the data distribution system of the second embodiment, and is comparable to FIGS. 7-9, respectively, of the first embodiment.

FIGS. 16-18 correspond to the operation of user 1 receiving content data distribution from distribution server 30 via cellular phone 100 by using memory card 114.

The distribution process differs from the distribution process of memory card 110 of the first embodiment in that step S166 is removed, and a step S170 described afterwards is carried out following step S168.

More specifically, content decryption key Kc, reproduction circuit restriction information AC2, the license ID, content ID and access restriction information AC1 received at step S168 are encrypted again by encryption processing unit 1452 using a secret key K(1) unique to memory card 110. The encrypted data {Kc//AC2//license ID//content ID//AC1}K(1) is recorded in memory 1415 outside module TRM (step S170).

The reason why content decryption key Kc, reproduction circuit control information AC2, the license ID, content ID and access restriction information AC1 are decrypted using private decryption key Km(1) at step S168 and then encrypted using secret key K(1) to be stored in memory 1415 is set forth in the following.

There is a possibility that the time required for the decryption process is extremely time consuming depending upon the combination of public encryption key KPm(1) and private decryption key Km(1) according to the public key scheme of asymmetric keys.

By encrypting these data using a public secret key K(1) unique to the memory card according to a symmetric key scheme that allows high speed decryption, the decryption process on content decryption key Kc and reproduction restriction information AC2 which are required for the reproduction process can be speeded in the content data reproduction process corresponding to the encrypted content data.

Furthermore, by altering the key used in the data transmission and the key for storage in the memory card, the level of security is improved.

As to the aforementioned public key scheme, the RAS cryptosystem (Rivest-Shamir-Adleman cryptosystem) and elliptic curve cryptosystem are known. As to the symmetric key encryption scheme, the DES (Data Encryption Standard) encryption scheme is known.

The above description is based on the structure of encrypting all the encrypted data based on key KPm(1)/Km(1) of the asymmetric public key encryption system using symmetric secret key K(1). Alternatively, a structure can be implemented in which data license ID, content ID and access restriction information AC1 stored in license hold unit 1440 provided in the TRM region in memory card 110 are not encrypted again and not stored in memory 1415, and encrypt content decryption key Kc and reproduction circuit control information AC2 are encrypted using secret key K(1) to be stored in memory 1415.

The remaining elements are similar to those of the distribution operation of the first embodiment. Corresponding steps have the same reference characters allotted, and description thereof will not be repeated.

[Reproduction Process]

Figure 19:
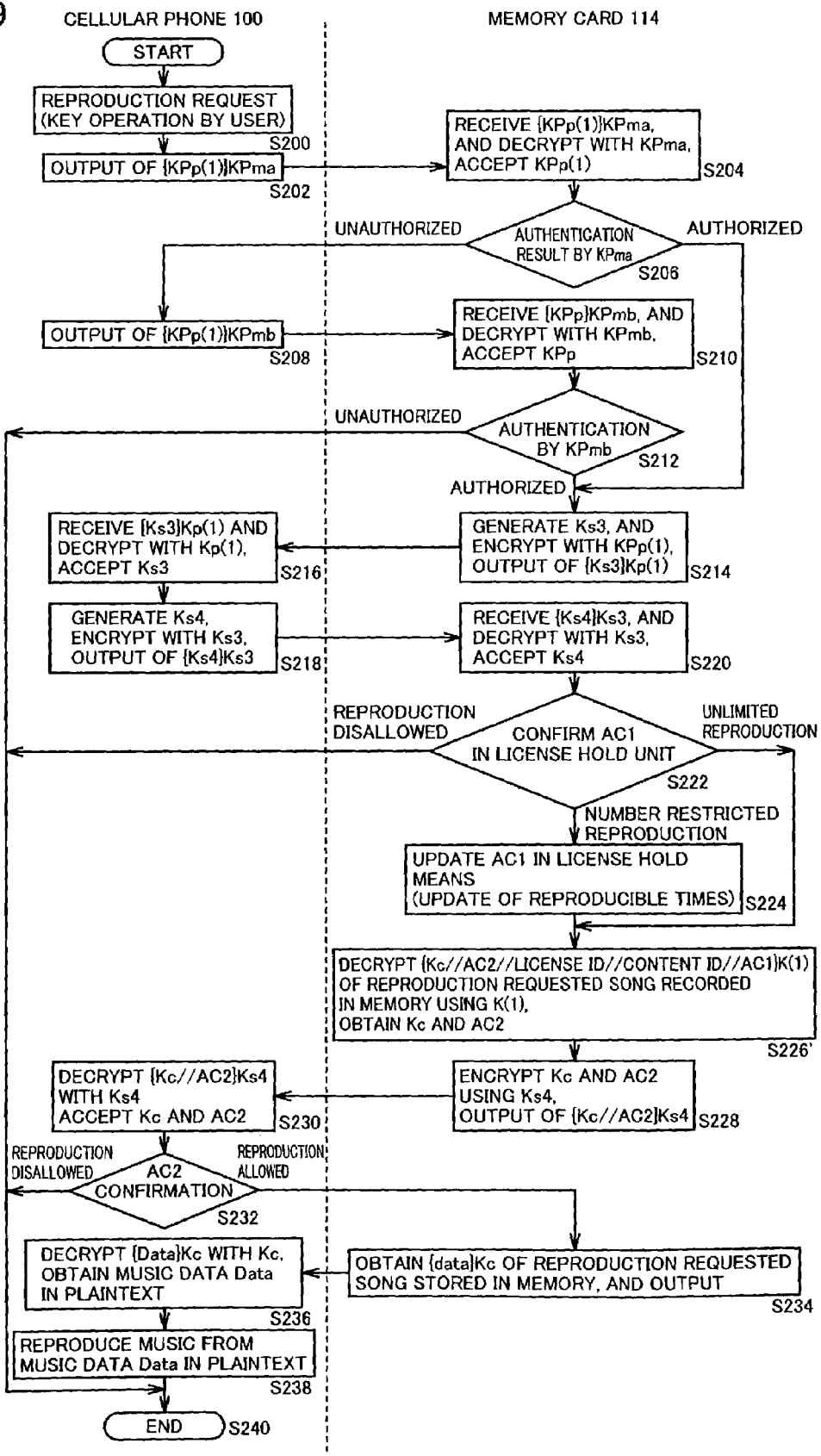
FIG. 19 is a flow chart to describe the operation of each component in a reproduction session when the memory card of the second embodiment is used.

FIG. 19 is a flow chart to describe the operation of each component in a reproduction session using the memory card of the second embodiment.

The reproduction session of the second embodiment differs from the reproduction process for memory card 110 of the first embodiment shown in FIG. 10 in that a step S226' of FIG. 19 is carried out instead of step S226 of FIG. 10 in a memory card 114. Specifically, in response to designation from controller 1420, encrypted data {Kc//AC2//license ID//content ID//AC1}K(1) read out onto data bus BS4 from memory 1415 is decrypted by decryption processing unit 1454 using secret key K(1) stored in K(1) hold unit 1450 to obtain content decryption key Kc and reproduction circuit restriction information AC2.

The remaining elements are similar to those of the reproduction operation of the first embodiment. Corresponding steps have the same reference characters allotted, and description thereof will not be repeated.

By such a structure, the time required for the decryption process in order to read out content decryption key Kc and reproduction circuit control information AC2 required for reproduction from memory card 110 in a reproduction session can be reduced. The user can initiate music reproduction promptly in response to a reproduction request.

The transfer operation of the memory card of the second embodiment is basically similar to the transfer operation of the first embodiment, provided that, in step S326 of FIG. 12, data {Kc//AC2//license ID//content ID//AC1}K(1) obtained from memory 1415 is decrypted using secret key K(1).

It is to be also noted that step S334 is not carried out at the memory card of the reception side. Content reproduction key Kc, reproduction circuit restriction information AC2, the license ID, content ID and access restriction information AC1 received at step S336 are encrypted again by encryption processing unit 1452 using secret key K(2) unique to the memory card, stored in K(2) hold unit 1450. The encrypted {Kc//AC2//license ID//content ID//AC1}K(2) is recorded in memory 1415 outside module TRM.

Third Embodiment

Figure 20:
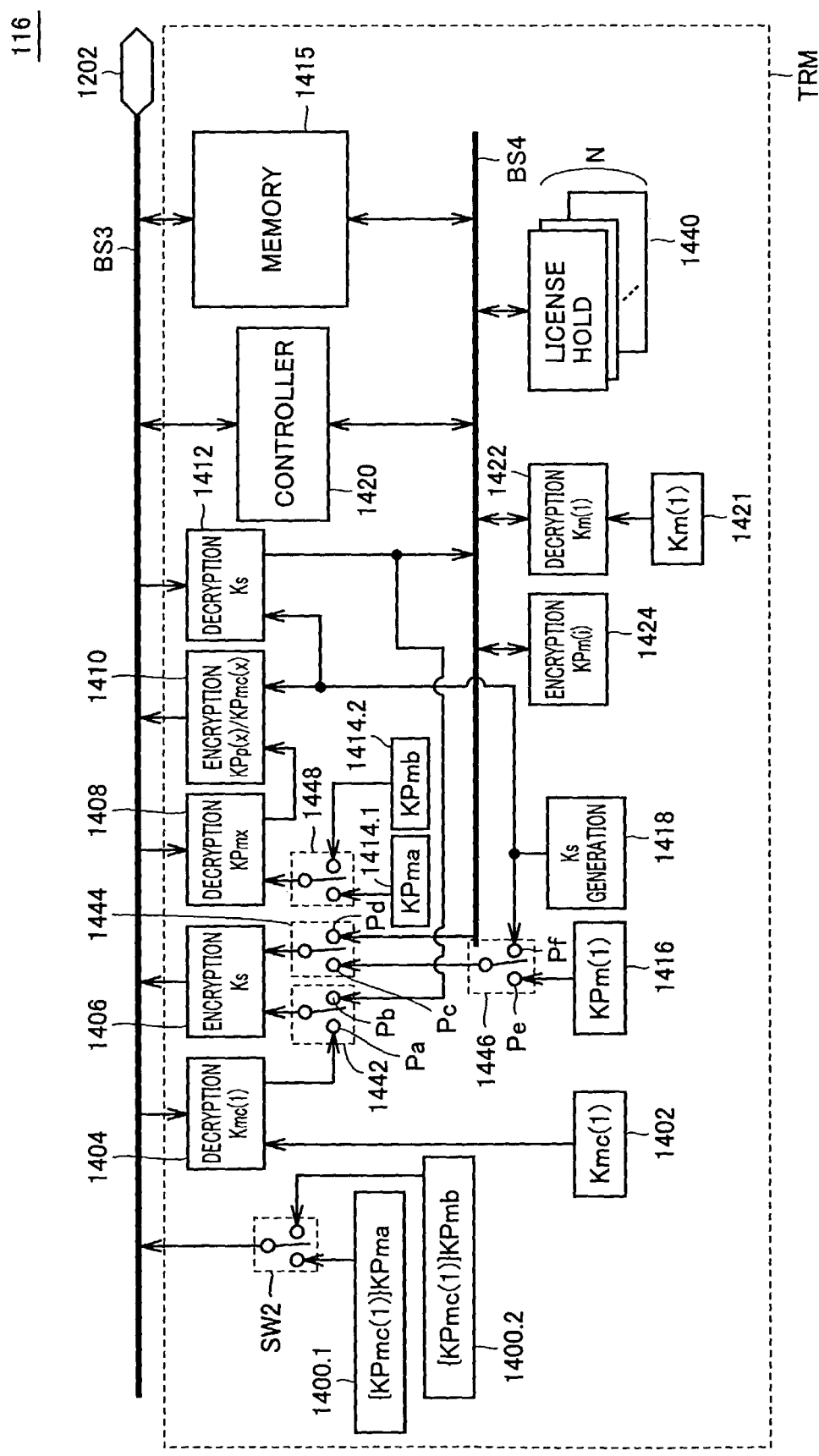
FIG. 20 is a block diagram showing a structure of a memory card 116 according to a third embodiment.

FIG. 20 is a block diagram showing a structure of a memory card 116 of the third embodiment, comparable to FIG. 6 of the first embodiment.

Referring to FIG. 20, memory card 116 differs from memory card 110 of the first embodiment shown in FIG. 6 in that memory 1415 is provided within module TRM. Furthermore, the structure of each bank in license hold unit 1440 is different. The bank is altered so as to hold the entire reproduction information.

The remaining elements are similar to those of the structure of memory card 110 of the first embodiment. Corresponding components of the same reference characters allotted and description thereof will not be repeated.

Figure 21:
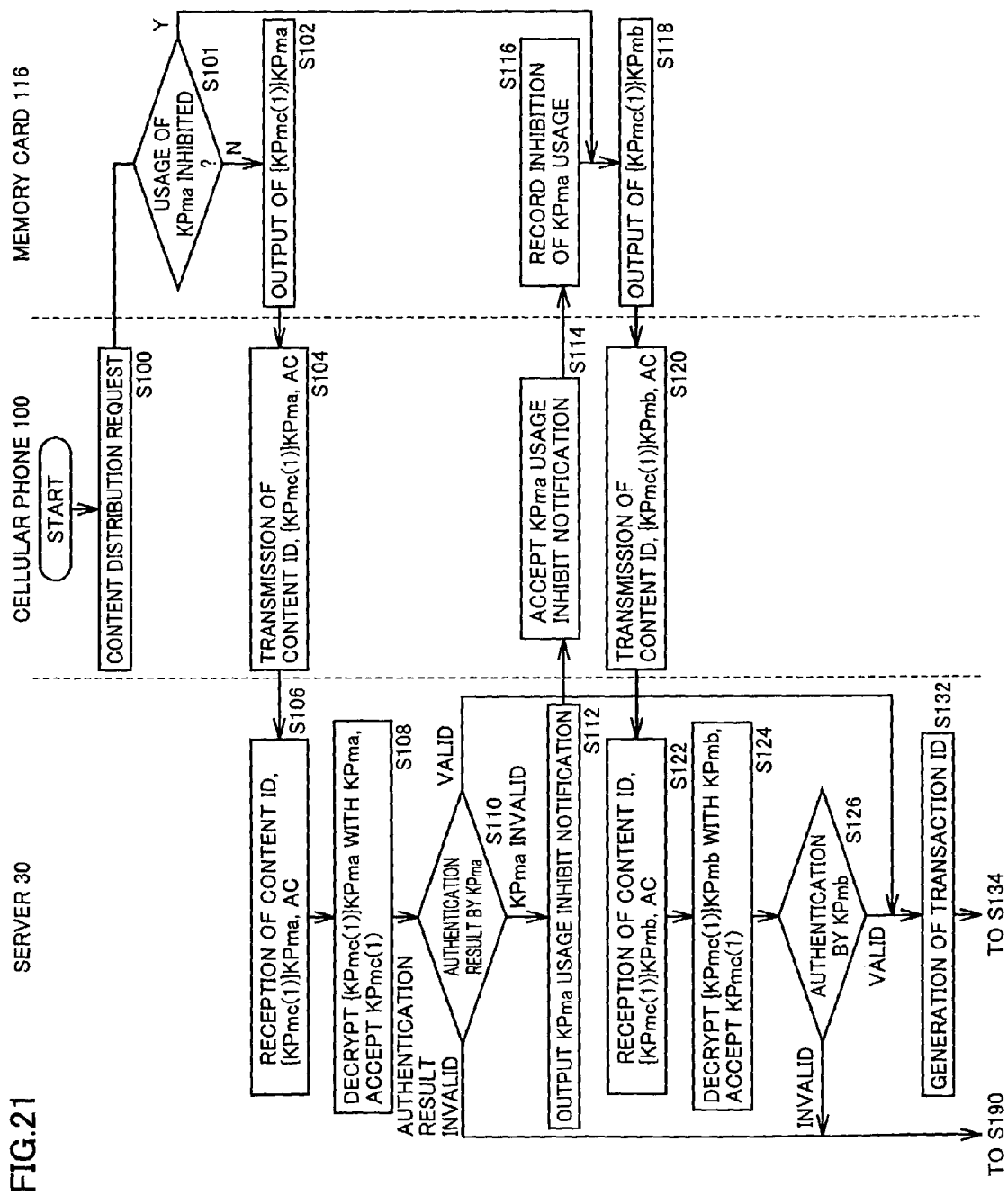
FIG. 21 is a first flow chart to describe the distribution operation in the event of purchasing content in the data distribution system of the third embodiment.
Figure 22:
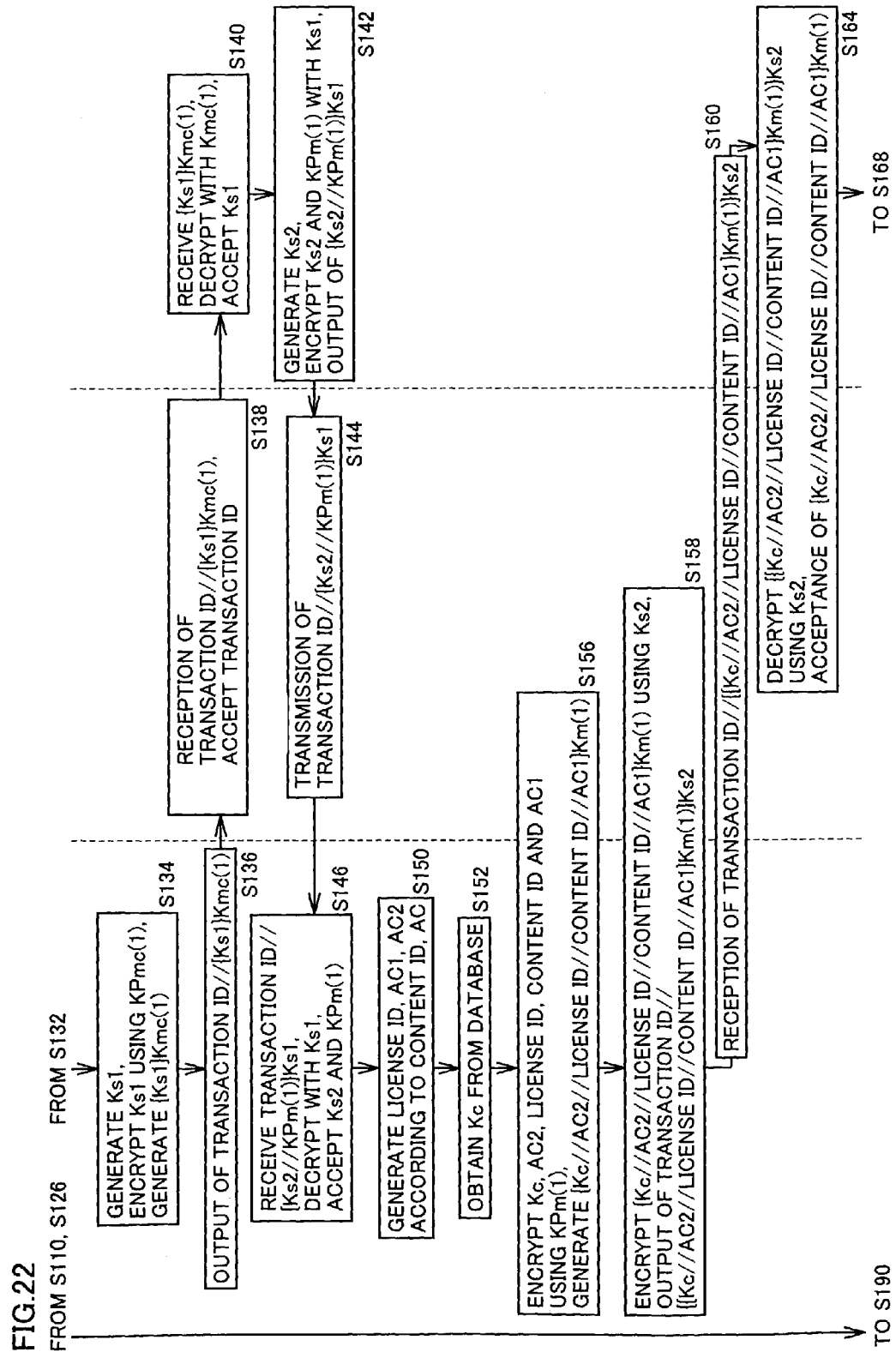
FIG. 22 is a second flow chart to describe the distribution operation in the event of purchasing content in the data distribution system of the third embodiment.
Figure 23:
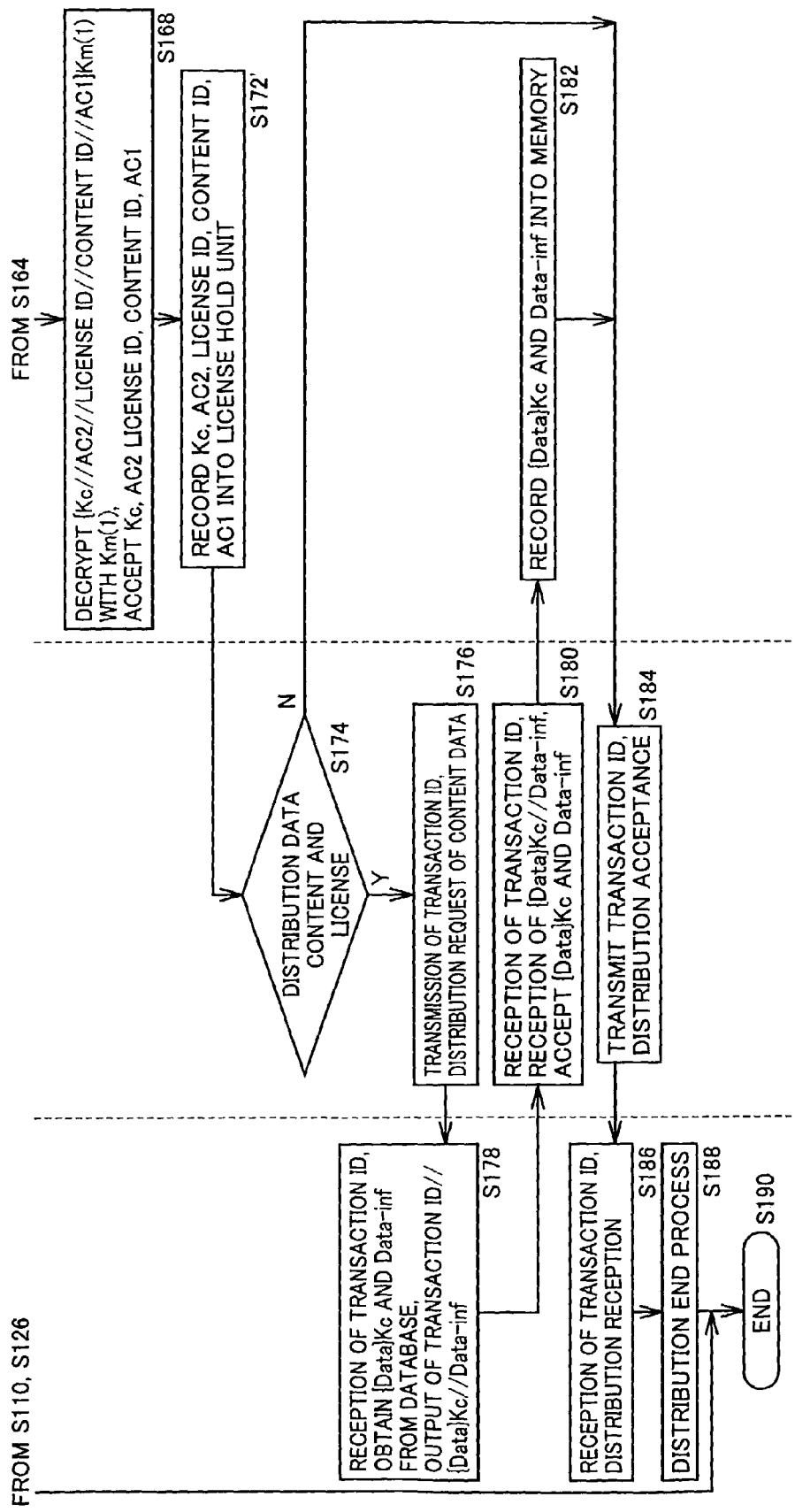
FIG. 23 is a third flow chart to describe the distribution operation in the event of purchasing content in the data distribution system of the third embodiment.

FIGS. 21, 22 and 23 are the first, second and third flow charts, respectively, to describe the distribution operation in the event of purchasing content data at the data distribution system of the third embodiment, and are comparable to FIGS. 7-9, respectively, of the first embodiment.

FIGS. 21-23 correspond to the operation of the user receiving content data distribution from distribution server 30 via cellular phone 100 by using memory card 116.

The present distribution process differs from that of memory card 110 of the first embodiment in that the recording process of data {Kc//AC2//license ID//content ID//AC1}Km(1) into memory 1415 at step S166 is not carried out in memory card 116, and a step S172' is carried out instead of step S172. At step S172', content decryption key Kc, reproduction circuit control information AC2, the license ID, content ID and access restriction information AC1 are recorded in a bank j that is the j-th empty bank in license hold unit 1440.

The remaining elements are similar to those of the distribution operation of the first embodiment. Corresponding steps have the same reference characters allotted, and description thereof will not be repeated.

[Reproduction Process]

Figure 24:
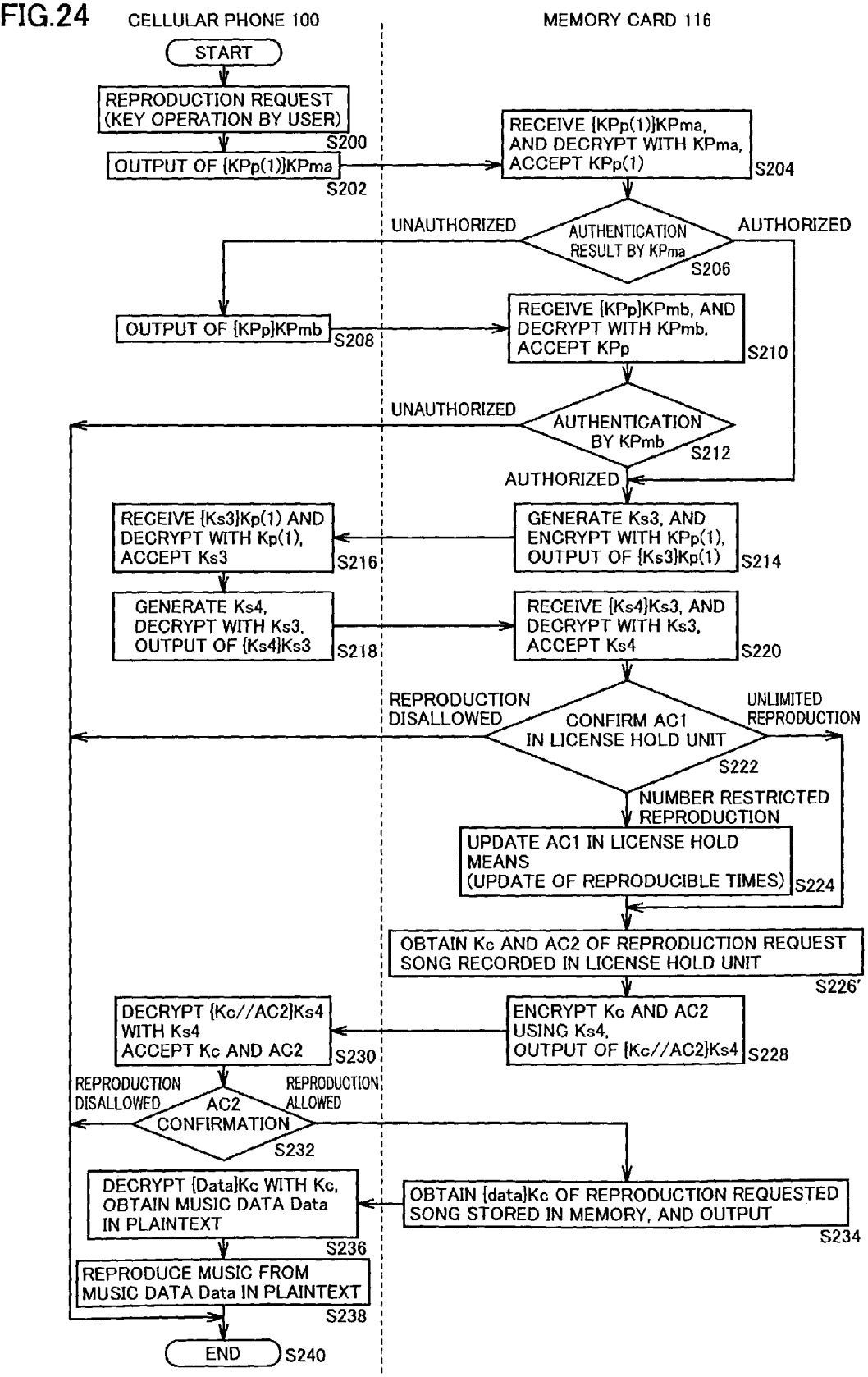
FIG. 24 is a flow chart to describe the reproduction operation using memory card 116 of the third embodiment.

FIG. 24 is a flow chart to describe the reproduction operation using memory card 116 of the third embodiment.

The reproduction operation differs from that of the first embodiment shown in FIG. 10 in that a step S226' is carried out instead of step S226. At step S226', content decryption key Kc and reproduction circuit restriction information AC2 of the song requested to be reproduced held in license hold unit 1440 are obtained.

The remaining elements are similar to those of the distribution operation of the first embodiment. Corresponding steps have the same reference characters allotted, and description thereof will not be repeated.

[Transfer Process]

Figure 27:
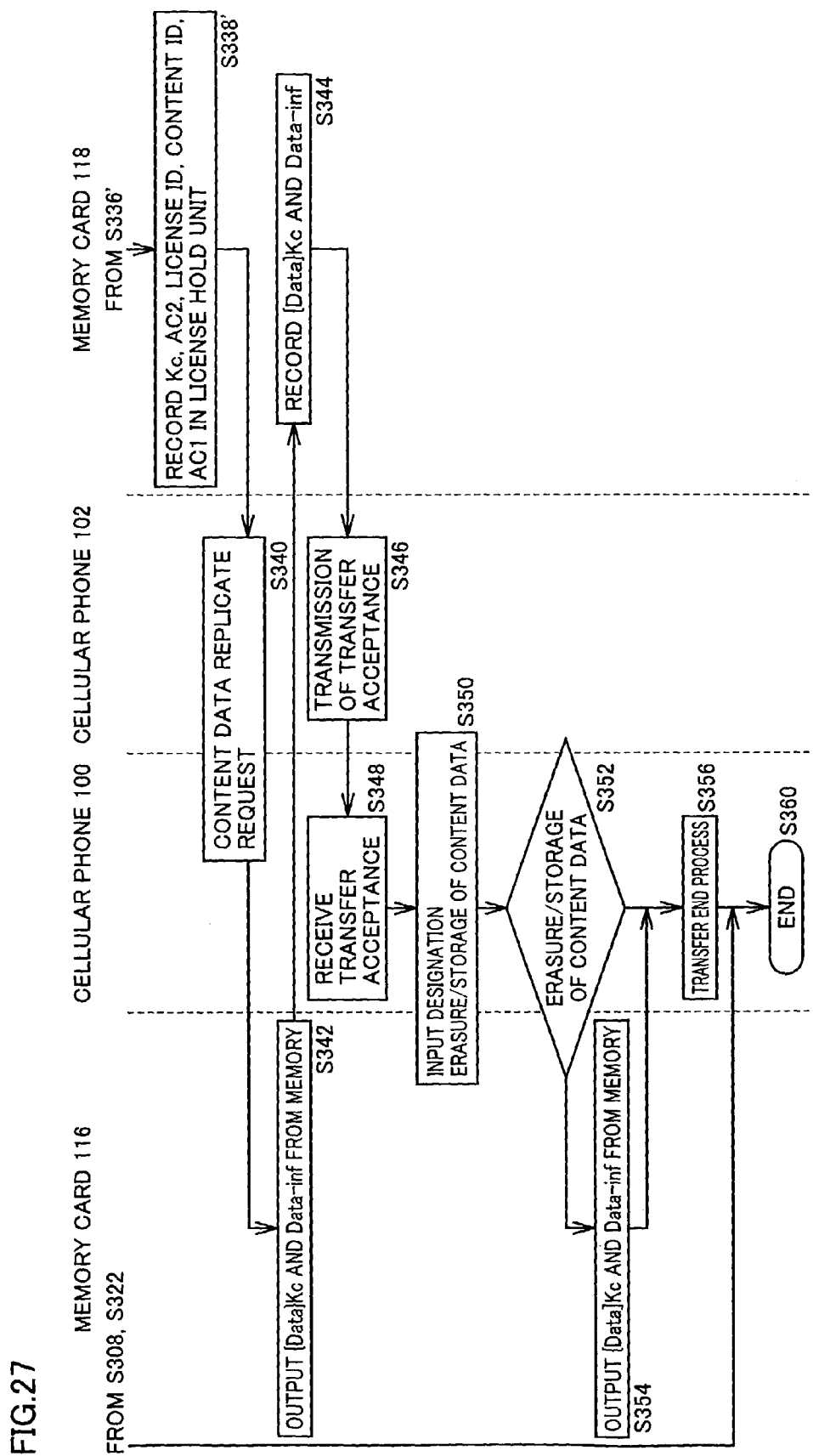
FIG. 27 is a third flow chart to describe the transfer process of the third embodiment.

FIGS. 25, 26 and 27 are the first, second and third flow charts, respectively, to describe the process of transferring content data and keys via cellular phones 100 and 102 between two memory cards 116 and 118 according to the third embodiment, and are comparable to FIGS. 11-13, respectively, of the first embodiment.

In FIGS. 25-27, the natural number x to identify the types of cellular phone 100 and memory card 116 is set to x=1, and the natural number x to identify the types of cellular phone 102 and memory card 118 is set to x=2. The natural number i to identify memory card 116 and memory card 118 is set to i=1 and i=2, respectively.

It is assumed that, in FIGS. 25-27, cellular phone 100 and memory card 116 correspond to the transmission side whereas cellular phone 102 and memory card 118 correspond to the reception side. It is assumed that a memory card 118 having a structure similar to that of memory card 116 is loaded in cellular phone 102. Components in memory card 118 corresponding to those of memory card 116 have the same reference characters allotted.

The transfer process of the present embodiment differs from the transfer process of the first embodiment as set forth below.

i) Step S325' is carried out instead of step S325 of FIG. 12 to obtain content decryption key Kc, reproduction circuit control information AC2, license ID, content ID and access restriction information AC1 from license hold unit 1440.

ii) Reading out data from memory 1415 in step S326 is omitted.

iii) Step 328' is carried out instead of step 328 to encrypt content decryption key Kc, reproduction circuit control information AC2, license ID, content ID and access restriction information AC1 obtained from license hold unit 1440 using encryption key KPm(2) to generate {Kc//AC2//license ID//content ID//AC1}Km(2).

iv) The recording process into the memory of step S334 is omitted.

v) Step S336' is carried out instead of step S336 to execute the process of accepting content decryption key Kc, reproduction circuit control information AC2, license ID, content ID and access restriction information AC1 by having decryption processing unit 1422 use private decryption key Km(2) unique to memory card 112 to decrypt {Kc//AC2//license ID//content ID//AC1}Km(2) encrypted with public encryption key KPm(2).

vi) Step S338' is carried out instead of step S338 to record content decryption key Kc, reproduction circuit control information AC2, license ID, content ID and access restriction information AC1 accepted by decryption processing unit 1422 in the bank specified by license hold unit 1440.

The remaining elements are similar to those of the transfer operation of the first embodiment. Corresponding steps have the same reference characters allotted, and description thereof will not be repeated.

By the above structure, an advantageous effect similar to that of the first embodiment can be achieved.

Respective processes of the first, second and third embodiments only differ in the process within the memory card, and there is no difference in data encryption outside the memory card. Transfer can be carried out by any combination of memory cards 110, 114 and 116 of the respective embodiments described previously as a combination of the transmission side and the reception side.

Therefore, memory cards 110, 114 and 116 are compatible memory cards.

The above description is based on the assumption that memory 1415 is a nonvolatile semiconductor recording medium that can be read and written arbitrarily, for example, a flash memory. However, a structure can be implemented in which memory 1415 is a semiconductor memory device dedicated for readout such as a mask ROM having content data, an encrypted content decryption key and the like already written therein at the stage of fabrication, and a portion of the reproduction information such as access restriction information AC1 and license ID is distributed.

Memory 1415 is not limited to a semiconductor recording medium, and may be another recording medium such as a card disk or optical disk. In this case, the license is recorded in an encrypted state similar to memory card 110 and memory card 116 when absent of module TRM.

The above description is based on a structure in which the process of receiving distributed data and storing the same in a memory card is effected through a cellular phone. However, the present invention is not limited to such a case, and a structure may be implemented in which the distributed data is stored with respect to a memory card by a dedicated terminal device to receive distribution, absent of the content reproduction circuit.

The usage of authentication key KPma in memory cards 110, 112 and 116 is inhibited through "KPma usage inhibit notification" in the above description. The usage can be inhibited using a certification revocation list CRL. In this case, the latest certification revocation list CRL is transmitted instead of "CPma usage inhibit notification" in the distribution session. Authentication data included in certification revocation list CRL, i.e. authentication data that can be authenticated through authentication key KPma, is excluded from the authentication subject in the memory card.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A license information storage apparatus to store license information supplied individually apart from encrypted content data, and that allows reproduction of encrypted content data, comprising:

first storage means for storing at least a portion of said license information, a plurality of authentication data hold means, each for storing a plurality of authentication data that are configured to be authenticated respectively by a plurality of public authentication keys, said plurality of authentication data having a predetermined value predefined during fabrication of said license information storage apparatus, and being configured to authenticate a first public encryption key corresponding to a type of said license information storage apparatus with respective said plurality of public authentication keys, first select means for selectively providing said authentication data from said plurality of authentication data hold means outside of said license information storage apparatus according to a request external to said license information storage apparatus, first key hold means for storing a first private decryption key asymmetric to said first public encryption key, and used to decrypt data encrypted with said first public encryption key, first decryption means receiving a first symmetric key supplied from a supply source of said license information, and encrypted with said first public encryption key for decrypting the received first symmetric key using said first private decryption key, session key generation means for generating a second symmetric key, session key encryption means for encrypting said second symmetric key used for encryption of said license information using said first symmetric key to supply the encrypted key to said supply source of said license information, and session key decryption means receiving said license information supplied from a supply source of said license information, and encrypted with said second symmetric key for decrypting the received license key with said second symmetric key.

2. The license information storage apparatus according to claim 1, further comprising: second key hold means for storing a second public encryption key predefined for each said license information storage apparatus, third key hold means for storing a second private decryption key asymmetric to said second public encryption key, and used to decrypt data encrypted with said second public encryption key, and second decryption means receiving said license information encrypted with said second public encryption key for decrypting the license information using said second private decryption key, wherein said session key encryption means encrypts said second public encryption key together with said second symmetric key using said first symmetric key for output to be provided to said supply source of said license information, wherein said session key decryption means receives said license information supplied from said supply source of said license information, encrypted with said second public encryption key, and further encrypted with said second symmetric key for decrypting the received license information using said second symmetric key.

3. The license information storage apparatus according to claim 2, wherein at least said first storage means, said plurality of authentication data hold means, said first select means, said first key hold means, said second key hold means, and said first decryption means are provided in a protection region to disable access from an external source.

4. The license information storage apparatus according to claim 2, further comprising: second storage means for storing in an encrypted state a content decryption key from said license information to decrypt said encrypted content data, a fourth key hold unit storing at least one symmetric type secret unique key in a symmetric key scheme, unique to every said license information storage apparatus, and first encryption means receiving and encrypting an output of said second decryption means using said secret unique key, wherein said second storage means stores said content decryption key encrypted with said first encryption means, and third decryption means for decrypting said content decryption key stored in said second storage means using said secret unique key.

5. The license information storage apparatus according to claim 1, wherein said first storage means is a semiconductor memory, and said license information storage apparatus is a memory card.

6. The license information storage apparatus according to claim 1, further comprising second storage means for storing said encrypted content data.

7. The license information storage apparatus according to claim 1, further comprising:

a plurality of authentication key hold means for storing said plurality of public authentication keys used to decrypt authentication data input from another apparatus for authentication, second select means for selecting and providing one of said public authentication keys from said plurality of authentication key hold means, authentication data decryption means for decrypting said authentication data input from said another apparatus using said public authentication key input from said second select means, and control means determining whether to output at least a portion of license information to said another apparatus based on at least one of said authentication data input from said another apparatus and a decryption result of said authentication data decryption means for controlling output of said at least a portion of said license information when determination is made to output.

8. A content reproduction apparatus decrypting encrypted content data for reproduction of content data, comprising:

a data storage unit detachable from said content reproduction apparatus, storing said encrypted content data and a content decryption key supplied individually apart from said encrypted content data, and required to decrypt said encrypted content data, and providing said content decrypting key in an encrypted state, and a data reproduction unit receiving an output from said data storage unit to reproduce said encrypted content data, wherein said data reproduction unit comprises first decryption means for carrying out a decryption process using a first symmetric key, based on said encrypted content decryption key from said data storage unit to extract said content decryption key, second decryption means receiving and decrypting said encrypted content data read out from said data storage unit using an output of said first decryption means to extract content data, and a plurality of authentication data hold means, each for storing a plurality of authentication data that are configured to be authenticated respectively with respective plurality of public authentication keys, and allowing output to said data storage unit, said plurality of authentication data having a predetermined value predefined during fabrication of said content reproduction apparatus, and being configured to authenticate a first public encryption key corresponding to a type of said content reproduction apparatus with respective said plurality of public authentication keys, select means for selectively providing data from said plurality of authentication data hold means outside of said data reproduction unit according to a request external to said data reproduction unit, first key hold means for storing a first private decryption key asymmetric to said first public encryption key, and used to decrypt data encrypted with said first public encryption key, third decryption means receiving a second symmetric key encrypted with said first public encryption key from said data storage unit for decrypting the received second symmetric key using said first private decryption key, session key generation means for generating said first symmetric key, and session key encryption means for encrypting said first symmetric key to be used for encryption of said content decryption key using said second symmetric key for provision to said data storage unit wherein said data storage unit comprises control means conducting an authentication process based on said authentication data from said select means to determine whether to output said encrypted content decryption key to said data reproduction unit based on an authentication result for controlling output to output said encrypted content decryption key that is encrypted with said first symmetric key when determination is made to output said content decryption key to said data reproduction unit.

9. The content reproduction apparatus according to claim 8, wherein said data storage unit includes a memory card detachable from said data reproduction unit.

10. A content reproduction apparatus to decrypt encrypted content data using a content decryption key for reproduction, loaded with a license information storage apparatus storing said encrypted content data and a content decryption key supplied individually apart from said encrypted content data, and required to decrypt and reproduce said encrypted content data, comprising:

first decryption means for performing decryption using a first symmetric key based on said content decryption key from said the license information storage apparatus to extract said content decryption key, second decryption means receiving and decrypting said encrypted content data read from said the license information storage apparatus using an output of said first decryption means to extract content data, and a plurality of authentication data hold means each for storing a plurality of authentication data that are configured to be authenticated using respective plurality of authentication keys stored in said license information storage apparatus, and allowing output to said license information storage apparatus, said plurality of authentication data having a predetermined value predefined during fabrication of said content reproduction apparatus, and being configured to authenticate a first public encryption key corresponding to a type of said content reproduction apparatus with respective said plurality of public authentication keys, select means for selectively providing one of said plurality of authentication data to said the license information storage apparatus for output, first key hold means for storing a first private decryption key asymmetric to said first public encryption key, and used to decrypt data encrypted with said first public encryption key, third decryption means receiving a second symmetric key encrypted with said first public encryption key from said license information storage apparatus for decrypting the received second symmetric key using said first private decryption key, session key generation means for generating said first symmetric key, and session key encryption means for encrypting said first symmetric key to be used for encryption of said content decryption key using said second symmetric key for provision to said license information storage apparatus.

11. A license information distribution system to distribute encrypted content data, and license information supplied individually apart from said encrypted content data and that allow reproduction of at least said encrypted content data, comprising:

a server to distribute said license information including a content decryption key used to decrypt said encrypted content data, and a reception terminal receiving said distributed license information, wherein said reception terminal comprises data storage unit detachable from said reception terminal for storing said encrypted content data and a content decryption key required to decrypt said encrypted content data, and providing said content decryption key in an encrypted state, wherein said data storage unit comprises first storage means for storing said encrypted content data, second storage means for storing at least a portion of said license information distributed by said distribution system, and a plurality of first authentication data hold means each for storing a plurality of authentication data that are configured to be authenticated by respective plurality of said public authentication keys common to said distribution system, said plurality of authentication data having a predetermined value predefined during fabrication of said data storage unit, and that being configured to authenticate a first public encryption key corresponding to a type of said data storage unit with respective said plurality of public authentication keys, first select means for selectively providing authentication data from said plurality of first authentication data hold means outside of said data storage unit according to a request external to said data storage unit, first key hold means for storing a first private decryption key asymmetric to said first public encryption key, and used to decrypt data encrypted with said first public encryption key, first decryption means receiving a first symmetric key encrypted with said first public encryption key from said server for decrypting the received key with said first private decryption key, session key generation means for generating a second symmetric key, session key encryption means for encrypting said second symmetric key used for encryption of said license information said first symmetric key to supply the encrypted key to said server, and session key decryption means receiving said license information supplied from a supply source of said license information, and encrypted with said second symmetric key for decryption with said second symmetric key, wherein said server comprises first control means to conduct an authentication process based on said authentication data from said data storage unit for encrypting said license information using said second symmetric key for distributing said license information when authentication is valid.

12. The license information distribution system according to claim 11, wherein said reception terminal further comprises a data reproduction unit decrypting said encrypted content data from said data storage unit to reproduce content data, said data reproduction unit including second decryption means for performing a decryption process using a first symmetric key based on said encrypted content decryption key from said data storage unit to extract said content decryption key, third decryption means receiving and decrypting said encrypted content data read out from said data storage unit using an output of said second decryption means to extract content data, a plurality of second authentication data hold means, each for storing a plurality of authentication data that are configured to be authenticated by respective plurality of public authentication keys common to said distribution system, and allowing output to said data storage unit, and second select means selectively providing data from said plurality of second authentication data hold means outside of said data reproduction unit according to a request external to said data reproduction unit, wherein said data storage unit further comprises a plurality of authentication key hold means for storing said plurality of public authentication keys used to decrypt said authentication data from said second select means for authentication, third select means for selecting and providing one of said public authentication key required to decrypt said authentication data from said second select means, and second control means for conducting an authentication process of said authentication data from said second select means using said public authentication key selected by said third select means to determine whether to output said license information, and controlling output of said license information when determination is made to output.

13. The license information distribution system according to claim 11, wherein said data storage unit includes a memory card detachable from said data reproduction unit.

14. A content reproduction apparatus decrypting encrypted content data using a content decryption key supplied individually apart from said encrypted content data and required to decrypt said encrypted content data for reproduction of content data, comprising:

first decryption means for applying a decryption process using a first symmetric key based on said content decryption key that is encrypted and supplied to extract said content decryption key, second decryption means receiving and decrypting said encrypted content data using an output of said first decryption means to extract content data, and a plurality of authentication data hold means each for storing a plurality of authentication data that are configured to be authenticated using respective plurality of public authentication keys, and allowing output outside said content reproduction apparatus, said plurality of authentication data having a predetermined value predefined during fabrication of said content reproduction apparatus, and being configured to authenticate a first public encryption key corresponding to a type of said content reproduction apparatus with respective said plurality of public authentication keys, select means for selectively providing data from said plurality of authentication data hold means to outside of said content reproduction apparatus for output according to a request external to said content reproduction apparatus, first key hold means for storing a first private decryption key asymmetric to said first public encryption key, and used to decrypt data encrypted with said first public encryption key, third decryption means receiving a second symmetric key encrypted with said first public encryption key for decrypting with said first private decryption key, session key generation means for generating said first symmetric key, and session key encryption means for encrypting said first symmetric key to be used for encryption of said content decryption key using said second symmetric key for provision to outside of said content reproduction apparatus.

15. A content reproduction apparatus receiving encrypted content data and a content decryption key supplied individually apart from said encrypted content data, and required to decrypt said encrypted content data to decrypt said encrypted content data using said content decryption key for reproduction, comprising:

first decryption means for applying a decryption process using a first symmetric key based on said content decryption key that is encrypted to extract said content decryption key, second decryption means receiving and decrypting said encrypted content data using an output of said first decryption means to extract content data, and a plurality of authentication data hold means each for storing a plurality of authentication data that are configured to be authenticated using respective plurality of authentication keys, said plurality of authentication data having a predetermined value predefined during fabrication of said content reproduction apparatus, and being configured to authenticate a first public encryption key corresponding to a type of said content reproduction apparatus with respective said plurality of public authentication keys, select means for selectively providing one of said plurality of authentication data to a license information storage apparatus, first key hold means for storing a first private decryption key asymmetric to said first public encryption key, and used to decrypt data encrypted with said first public encryption key, third decryption means receiving a second symmetric key encrypted with said first public encryption key for decrypting with said first private decryption key, session key generation means for generating said first symmetric key, and session key encryption means for encrypting said first symmetric key to be used for encryption of said content decryption key using said second symmetric key for output.

16. The license information storage apparatus according to claim 7, wherein said authentication data input from said another apparatus includes a third public encryption key, said license information storage apparatus further comprising first encryption means for encrypting data using said third public encryption key, when determination is made to output said license information to said another apparatus at said control means, said session key generation means generating a third symmetric key, and said first encryption means encrypting said third symmetric key using said third public encryption key for output to be provided to said another apparatus, when a fourth symmetric key encrypted with said third symmetric key is input from said another apparatus, said session key decryption means decrypting using said third symmetric key said fourth symmetric key encrypted with said third symmetric key, and said session key encryption means encrypting at least a portion of license information including said content decryption key using said fourth symmetric key for output to be supplied to said another apparatus.

17. The license information storage apparatus according to claim 16, wherein a fourth public encryption key unique to said another apparatus is encrypted together with said fourth symmetric key using said third symmetric key, and supplied from said another apparatus, said license information storage apparatus further comprising second encryption means encrypting data using said fourth public encryption key, when said fourth public encryption key encrypted together with said fourth symmetric key using said third symmetric key is input from said another apparatus, said session key decryption means decrypting using said third symmetric key said received fourth public encryption key encrypted together with said fourth symmetric key using said third symmetric key, said second encryption means encrypting said license information using said fourth public encryption key, and said session key encryption means further encrypting using said fourth symmetric key said license information encrypted with said fourth public encryption key to be supplied to said another apparatus.

* * * * *